(12) United States Patent
Schmidt et al.

(10) Patent No.: US 10,046,214 B2
(45) Date of Patent: Aug. 14, 2018

(54) POWERED VEHICLE AND RAKES MOUNTABLE THEREON FOR GROOMING GRANULAR GROUND SURFACES

(71) Applicants: Larry W. Schmidt, Farmington, MN (US); Andrew J. Kjolhaug, Rosemount, MN (US); Joseph P. Thelen, Shakopee, MN (US); Cal N. Kosieracki, St. Louis Park, MN (US)

(72) Inventors: Larry W. Schmidt, Farmington, MN (US); Andrew J. Kjolhaug, Rosemount, MN (US); Joseph P. Thelen, Shakopee, MN (US); Cal N. Kosieracki, St. Louis Park, MN (US)

(73) Assignee: The Toro Company, Bloomington, MN (US)

( * ) Notice: Subject to any disclaimer, the term of this patent is extended or adjusted under 35 U.S.C. 154(b) by 425 days.

(21) Appl. No.: 13/829,673

(22) Filed: Mar. 14, 2013

(65) Prior Publication Data

US 2014/0262387 A1    Sep. 18, 2014

(51) Int. Cl.
| | | |
|---|---|---|
| *E02F 3/76* | (2006.01) | |
| *A63B 57/00* | (2015.01) | |
| *A01B 35/04* | (2006.01) | |
| *A63B 57/50* | (2015.01) | |
| *A01B 35/08* | (2006.01) | |

(52) U.S. Cl.
CPC .......... *A63B 57/0068* (2013.01); *A01B 35/04* (2013.01); *A63B 57/50* (2015.10); *A01B 35/08* (2013.01)

(58) Field of Classification Search
CPC ....................................................... E02F 3/7631
USPC .................................... 172/684.5; 15/236.08
See application file for complete search history.

(56) References Cited

U.S. PATENT DOCUMENTS

| | | | | |
|---|---|---|---|---|
| 1,674,306 A | * | 6/1928 | Shaw | 15/78 |
| 1,865,812 A | * | 7/1932 | Anderson | 172/684.5 |
| 2,560,711 A | * | 7/1951 | Arps | 172/445.2 |
| 3,069,792 A | * | 12/1962 | Ryals | 172/445.2 |
| 3,613,802 A | * | 10/1971 | Carlson et al. | 172/457 |
| 3,666,020 A | * | 5/1972 | Hess | E01H 4/02 15/236.06 |
| 3,739,860 A | * | 6/1973 | Rogers | 172/612 |
| 3,808,739 A | * | 5/1974 | Newgent | E01H 1/108 15/245 |
| 3,823,781 A | * | 7/1974 | Check et al. | 172/192 |

(Continued)

*Primary Examiner* — Thomas B Will
*Assistant Examiner* — Joel F. Mitchell
(74) *Attorney, Agent, or Firm* — James W. Miller

(57) ABSTRACT

A vehicle attached rake for grooming a granular surface includes a center section and two pivotal wing sections that carry rubber trowel members having a serrated lower edge that forms a plurality of downwardly extending teeth. The tips of the teeth are located on a large diameter, upwardly facing curve to better groom upwardly curved side walls in a golf course bunker. When the rake is attached to a ZRT vehicle, the wing section on the inside of a zero radius turn is automatically lifted up off the granular surface by a flexible tether that becomes taut. Another embodiment of the rake includes a rigid plate behind a rubber trowel member with a lower portion of the trowel member folding forwardly during reverse motion of the vehicle such that the plate engages the granular surface to act as a bulldozer blade.

7 Claims, 15 Drawing Sheets

(56) References Cited

U.S. PATENT DOCUMENTS

| | | | |
|---|---|---|---|
| 4,583,307 A * | 4/1986 | Lenert | A01B 35/16 |
| | | | 172/519 |
| 4,651,450 A * | 3/1987 | York | E01H 4/02 |
| | | | 15/236.08 |
| 4,651,451 A * | 3/1987 | Beeley et al. | 37/219 |
| 4,989,676 A * | 2/1991 | Rogers | 172/438 |
| 5,465,510 A * | 11/1995 | Goodnough et al. | E04D 13/106 |
| | | | 294/54.5 |
| 5,497,569 A * | 3/1996 | Byman | B66F 9/12 |
| | | | 15/245 |
| 5,890,545 A * | 4/1999 | Smith et al. | 172/200 |
| 7,464,528 B1 * | 12/2008 | Street et al. | 56/371 |
| 9,545,050 B2 * | 1/2017 | Fichera | A01D 34/001 |

* cited by examiner

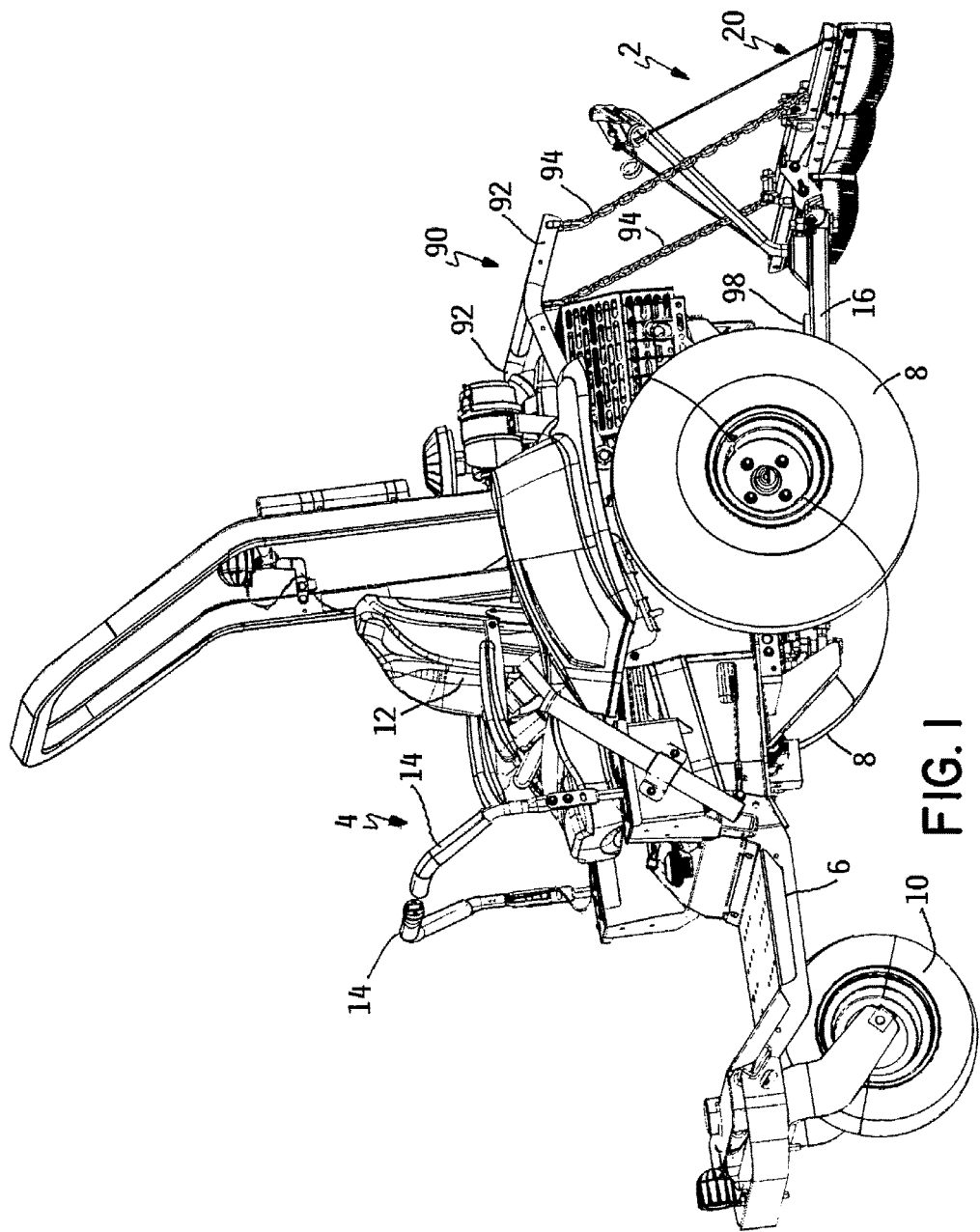

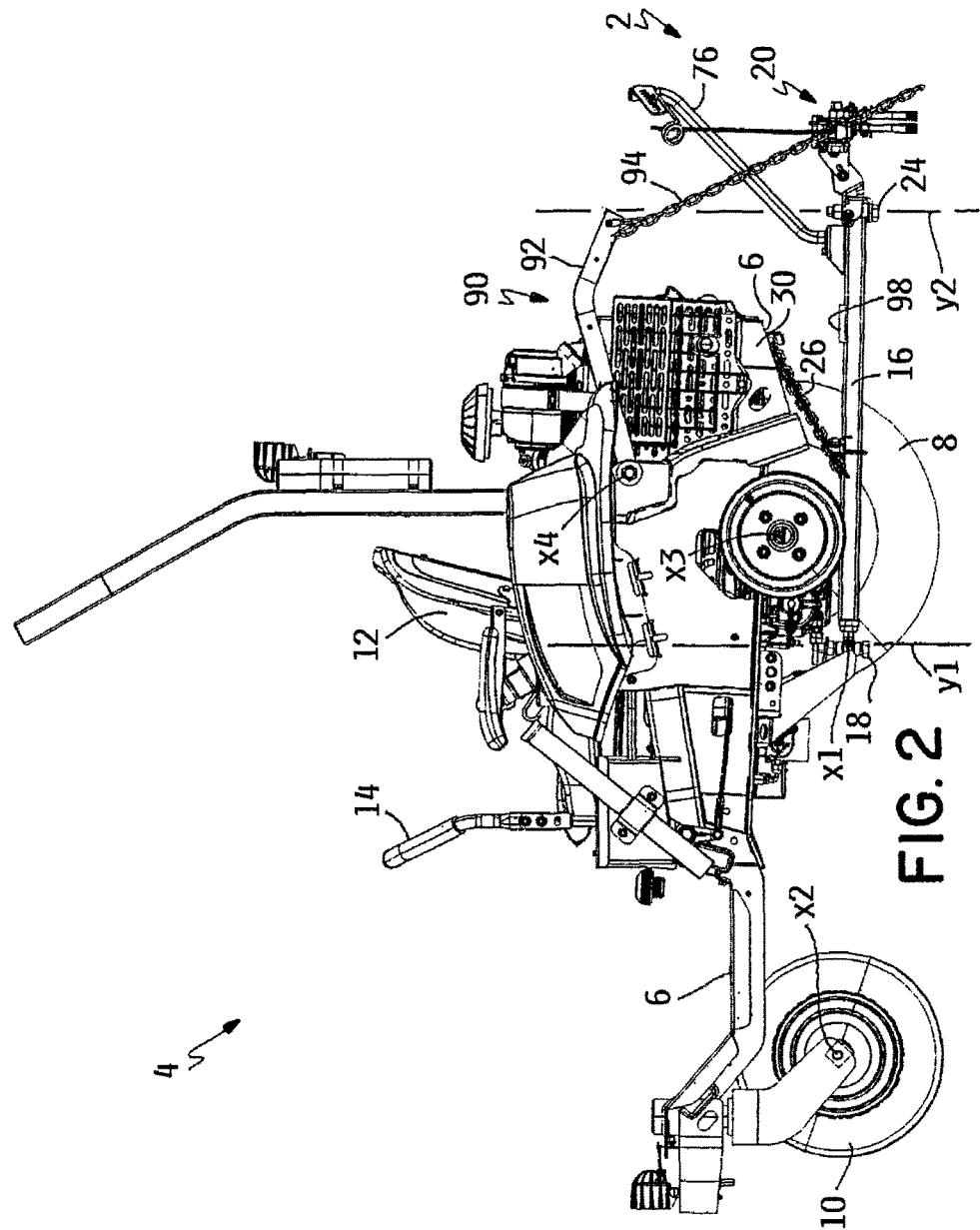

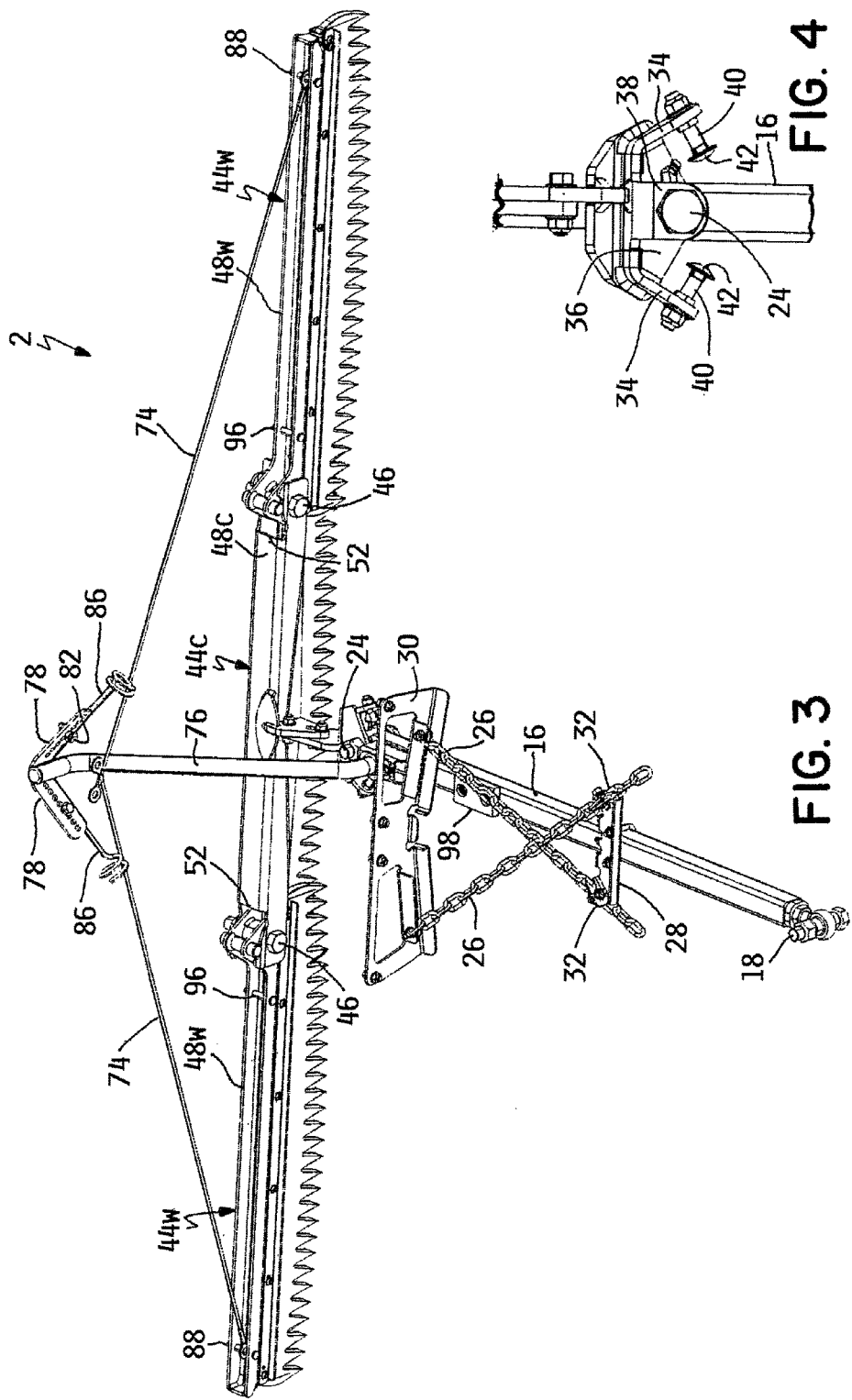

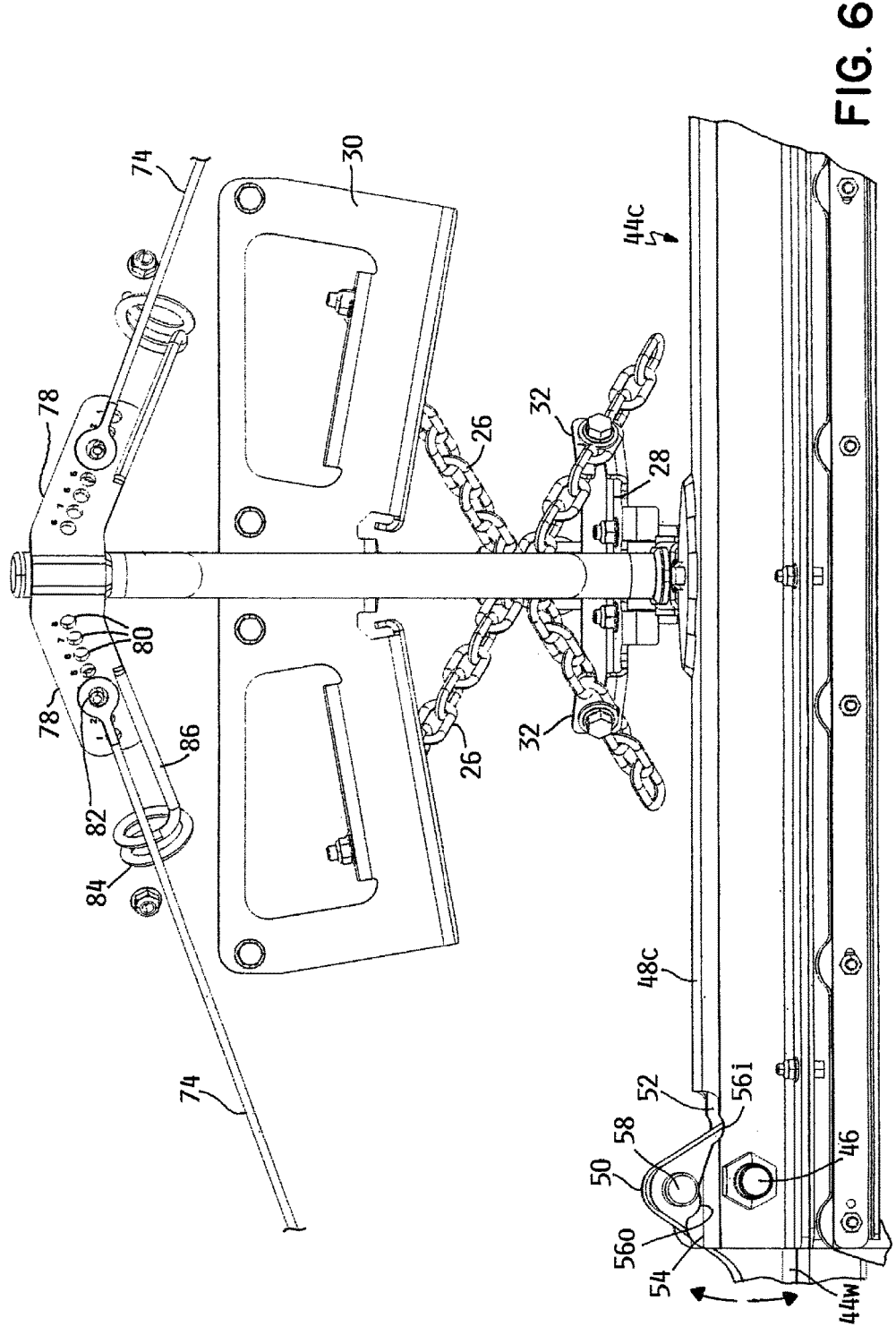

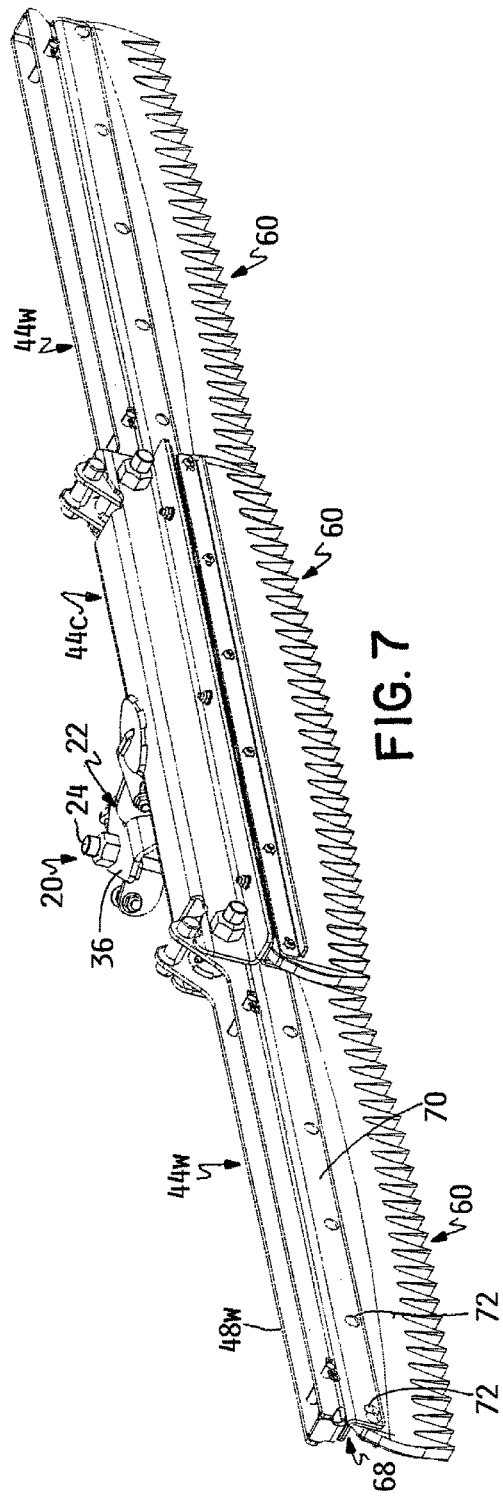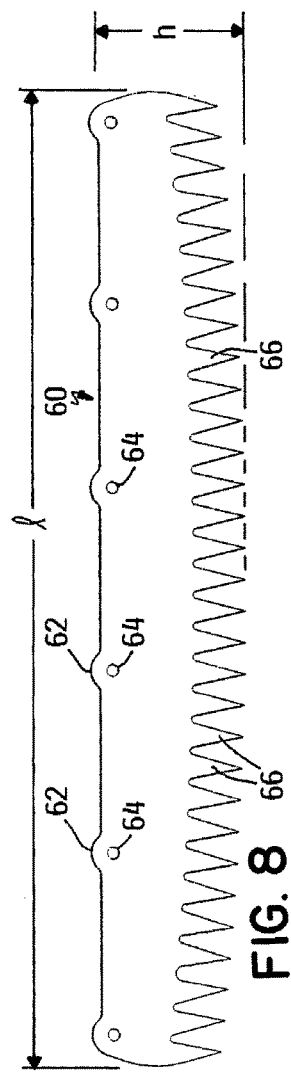

POWERED VEHICLE AND RAKES MOUNTABLE THEREON FOR GROOMING GRANULAR GROUND SURFACES

TECHNICAL FIELD

This invention relates to a powered movable vehicle and to trailing towed rakes that can be used on such a vehicle with the rakes engaging and smoothing a ground surface made of a granular material, e.g. sand, relatively loose dirt, or the like, as the vehicle is driven over the ground surface.

BACKGROUND OF THE INVENTION

Small powered vehicles are known for grooming sand surfaces such as those found in the sand traps or bunkers of golf courses. These vehicles typically have three ground engaging wheels arranged in a tricycle configuration comprising a steerable front wheel and two rear drive wheels. An operator sits on a seat on the vehicle and drives and steers the vehicle using a steering wheel adjacent the seat. The SAND PRO® brand of bunker rakes manufactured and sold by The Toro Company, the assignee of this invention, is a well-known line of sand grooming vehicles of this type.

A trailing rake is towed behind sand grooming vehicles of this type to engage and smooth the sand. Traditionally, such rakes include a plurality of independently movable rake sections that dress or smooth the sand in a final finishing operation. Each such smoothing rake section typically comprises a substantially rigid plate having a plurality of V-shaped teeth disposed along a lower rear edge thereof. These rigid plates are normally angled rearwardly and downwardly relative to the forward direction of motion of the vehicle. Sometimes, the angle of inclination of the plates is so great that the plates are almost completely horizontal to lie atop the sand like a mat. As the vehicle is driven forwardly, the rigid plates and the rake teeth formed at the lower or rear edges thereof engage and groom the sand to provide a smooth and finished looking surface to the sand as the smoothing rake sections are towed over the sand by the vehicle. U.S. Pat. No. 3,823,781 shows a sand grooming vehicle with a trailing rake of this type.

The types of sand grooming vehicles and rakes known in the art are not free of problems when one attempts to use them in the bunkers of modern golf courses. Over the years, golf course bunkers have generally become smaller, are often more contoured in the sense of having steeply angled sides along their periphery, and are used in greater numbers on a golf course than their older counterparts. The rigid plates and rake teeth often found in the traditional smoothing rake sections of known grooming rakes are prone to catching on, ripping and thus damaging either the lip of the bunker or an underlying artificial liner material that is sometimes used beneath the sand of the bunker for various purposes. Such damage can be time consuming and expensive to repair or is, at the very least, unsightly if left unrepaired.

Moreover, the Applicants have also discovered that the configuration of the plates and rake teeth do not always adequately reach and contact the sand. This occurs particularly along the periphery of the bunker where the steeply curved or angled sides of the bunker transition to a flatter bottom portion of the bunker. In such a situation, the Applicants have found that a middle portion of the traditional grooming rake section will be spaced up above and thus out of engagement with the sand when the rake section tilts upwardly about its inner end to attempt to follow the contours of the angled side of the bunker. An ungroomed strip of sand will result wherever this happens, thus detracting from the uniform appearance that is the desired end result when grooming a golf course bunker. Accordingly, it would be an advance in the art to provide a vehicle propelled sand grooming rake that would address the above-noted problems.

Sand is not the only granular surface that is groomed by vehicles that tow grooming rakes. Another such granular surface comprises the type of dirt used on the dirt surfaces of a baseball field, e.g. in the infield and base paths, around the dugouts, or in the outfield warning track. The grooming rakes used on such dirt surfaces are similar to but are generally configured somewhat differently than those used on sand surfaces. For example, grooming rakes used on a baseball field sometimes often comprise laterally extending rows of rigid teeth that scarify the dirt surface to loosen and break up the surface prior to a subsequently conducted finishing operation. Such grooming rakes are often called nail drags in the art.

One problem with prior art grooming rakes is that the nail drag implement is typically separate from the dirt finishing implement. This requires two separate operations; the first is to use the nail drag to loosen the dirt and the second is to use the finishing implement to smooth the dirt. In addition, it is not uncommon when maintaining dirt surfaces to need to push dirt from one place to another for various purposes, e.g. to level a high spot in the surface or to fill in a hole or low spot in the surface. However, in the art, this dirt pushing activity is done using a separate bulldozer type blade that is often mounted to the front of the vehicle. Thus, it would be a further advance in the art to have a grooming rake adapted for use with a granular surface comprising a dirt surface with the rake performing the scarifying and dirt smoothing operations in a single pass and with the rake also being able to function as a dirt pushing blade. Such an advance would be more productive in terms of labor costs and more cost effective in terms of purchase costs than the traditional multiple steps and multiple implements of the prior art.

SUMMARY OF THE INVENTION

One aspect of this invention relates to an apparatus for smoothing a granular ground surface. The apparatus comprises a vehicle having a frame that carries at least three ground engaging wheels for supporting the vehicle for rolling over the granular ground surface. The wheels include at least one front wheel rotatable about a front horizontal axis of rotation on the vehicle frame and at least one rear wheel rotatable about a rear horizontal axis of the rotation on the vehicle frame. A grooming rake is provided for attachment to the vehicle. The grooming rake includes a hitch having a front end and a rear end. The front end of the hitch has a first pivot connection to the vehicle frame to allow the hitch to rotate relative to the vehicle frame about a first substantially vertical pivot axis. The grooming rake also includes a rake head which supports at least one laterally extending grooming member that engages the granular surface to smooth the granular surface as the vehicle traverses over the granular surface. The rear end of the hitch has a second pivot connection to the rake head to allow the rake head to rotate relative to the hitch about a second substantially vertical pivot axis.

Another aspect of this invention relates to a rake for smoothing a granular ground surface. The rake is suited for attachment to a vehicle having a frame that carries at least three ground engaging wheels for supporting the vehicle for rolling over the granular ground surface. The rake comprises a hitch having a front end and a rear end, the front end of the hitch having a first pivot connection to the vehicle frame to allow the hitch to rotate relative to the vehicle frame about a substantially vertical pivot axis. The rake further comprises a rake head comprising a center section and two pivotal wing sections on either side of the center section. The center section is operatively secured to the rear end of the hitch. The center section and each wing section includes a downwardly extending, substantially vertical trowel member made of a sheet of flexible, substantially planar, rubber material for engaging and smoothing the granular surface. The wing sections are pivotal relative to the center section about longitudinally extending, substantially horizontal pivot axes such that each wing section can pivot up and down relative to the center section in a vertical plane to follow the contours of curved ground side walls in or adjacent to the granular ground surface being groomed.

Yet another aspect of this invention relates to a rake for smoothing a granular ground surface, the rake being suited for attachment to a vehicle. The rake comprises a rake head comprising a center section and two pivotal wing sections on either side of the center section. The center section is operatively secured to one end of the vehicle for propelling the rake head over the granular surface by movement of the vehicle over the granular surface. The center section and each wing section include a downwardly extending, substantially vertical trowel member for engaging and smoothing the granular surface. The wing sections are pivotal relative to the center section about longitudinally extending, substantially horizontal pivot axes such that each wing section can pivot up and down relative to the center section in a vertical plane. The trowel members in the wing sections have a lower edge that includes an upwardly curved portion having a predetermined length along the trowel members such that a center of the trowel member is lower than opposite sides of the trowel member when the wing sections are substantially horizontal. The upwardly curved portions of the lower edges of the trowel members of the wing sections better follow curved side contours in the granular surface as the wing sections pivot upwardly to thereby more effectively engage and smooth such side contours.

An additional aspect of this invention relates to an apparatus for smoothing a granular ground surface and for pushing portions of the granular surface from one location to another location. The apparatus comprises a vehicle having a frame that carries a plurality ground engaging wheels for supporting the vehicle for rolling over the granular ground surface. The vehicle is capable of forward and reverse operation. A grooming rake is attached to the vehicle such that the grooming rake moves forwardly when the vehicle moves forwardly and the grooming rake moves rearwardly when the vehicle moves rearwardly. The grooming rake comprises a laterally extending trowel member made of a flexible material. The trowel member has a lower edge that engages and smoothes the granular surface as the vehicle and the grooming rake move forwardly. A substantially rigid plate is behind the trowel member when the grooming rake is moving forwardly. The plate overlies at least a central portion of the trowel member with the plate having a lower edge that is disposed above the lower edge of the trowel member such that a lower portion of the trowel member adjacent the lower edge of the trowel member is uncovered beneath the lower edge of the plate. The trowel member is sufficiently flexible such that the lower portion of the trowel member flexes or folds forwardly as the vehicle and the grooming rake move rearwardly to permit the lower edge of the plate to drop down and engage the granular surface and to thereafter push portions of the granular surface from one location to another location during reverse motion of the grooming rake and the vehicle.

One more aspect of this invention relates to an apparatus for conducting a ground grooming or working operation. The apparatus comprises a vehicle having substantially independent left and right traction drive systems to be capable of substantially zero radius turn operation. The traction drive systems are controlled by an operator through the use of independent pivotal left and right controls. An implement is provided for conducting a ground grooming or working operation. The implement is operatively connected to the vehicle by a lift and lower system for permitting the implement to be disposed in a raised transport position out of contact with the ground or a lowered operational position in contact with the ground. A speed limiting system is operatively coupled to the implement for permitting a first maximum forward ground speed when the implement is in the raised transport position and for automatically limiting the maximum forward ground speed to a lower value than the first speed whenever the implement is placed into its lowered operational position. The speed limiting system comprises a pair of stops that are interposed into a forward path of travel of the controls from a neutral position thereof when the implement is placed into its lowered operational position to prevent the controls from moving over a full forward range of motion thereof with the stops being displaced outside of the forward path of travel of the controls when the implement is in the raised transport position to allow the controls to move through the full forward range of motion thereof.

BRIEF DESCRIPTION OF THE DRAWINGS

This invention will be described more specifically in the following Detailed Description, when taken in conjunction with the following drawings, in which like reference numerals refer to like elements throughout.

FIG. 1 is a perspective view of a first embodiment according to this invention of a grooming rake for grooming a granular surface, particularly illustrating the grooming rake attached to the rear of a Zero Radius Turn (ZRT) traction vehicle and showing the grooming rake in a lowered grooming position in contact with a granular surface comprising sand;

FIG. 2 is a side elevational view of the grooming rake of FIG. 1, particularly illustrating the vehicle with one of the rear drive wheels removed so as to show the front and rear substantially vertical pivot axes of the grooming rake;

FIG. 3 is a perspective view of the grooming rake of FIG. 1;

FIG. 4 is a bottom view of a portion of the grooming rake of FIG. 1, particularly illustrating the spaced stops that limit rotational movement of the rake head relative to the hitch arm of the grooming rake;

FIG. 6 is a perspective view of a portion of the grooming rake of FIG. 1 from the rear of the grooming rake, particularly illustrating the attachment of the upper ends of the flexible tethers that extend from the wing sections to the post provided on the hitch arm as well as showing the crossed chains that limit rotational movement of the hitch arm relative to the vehicle;

FIG. 7 is a perspective view of a portion of the grooming rake of FIG. 1, particularly illustrating the rake head of the grooming rake comprising a laterally extending center rake section with two pivotal wing rake sections extending laterally from opposite ends thereof with each rake section having a downwardly extending rubber trowel member having a serrated, toothed lower edge;

FIG. 8 is a plan view of one of the rubber trowel members used in the rake sections shown in FIG. 7;

DETAILED DESCRIPTION

Figure 5:
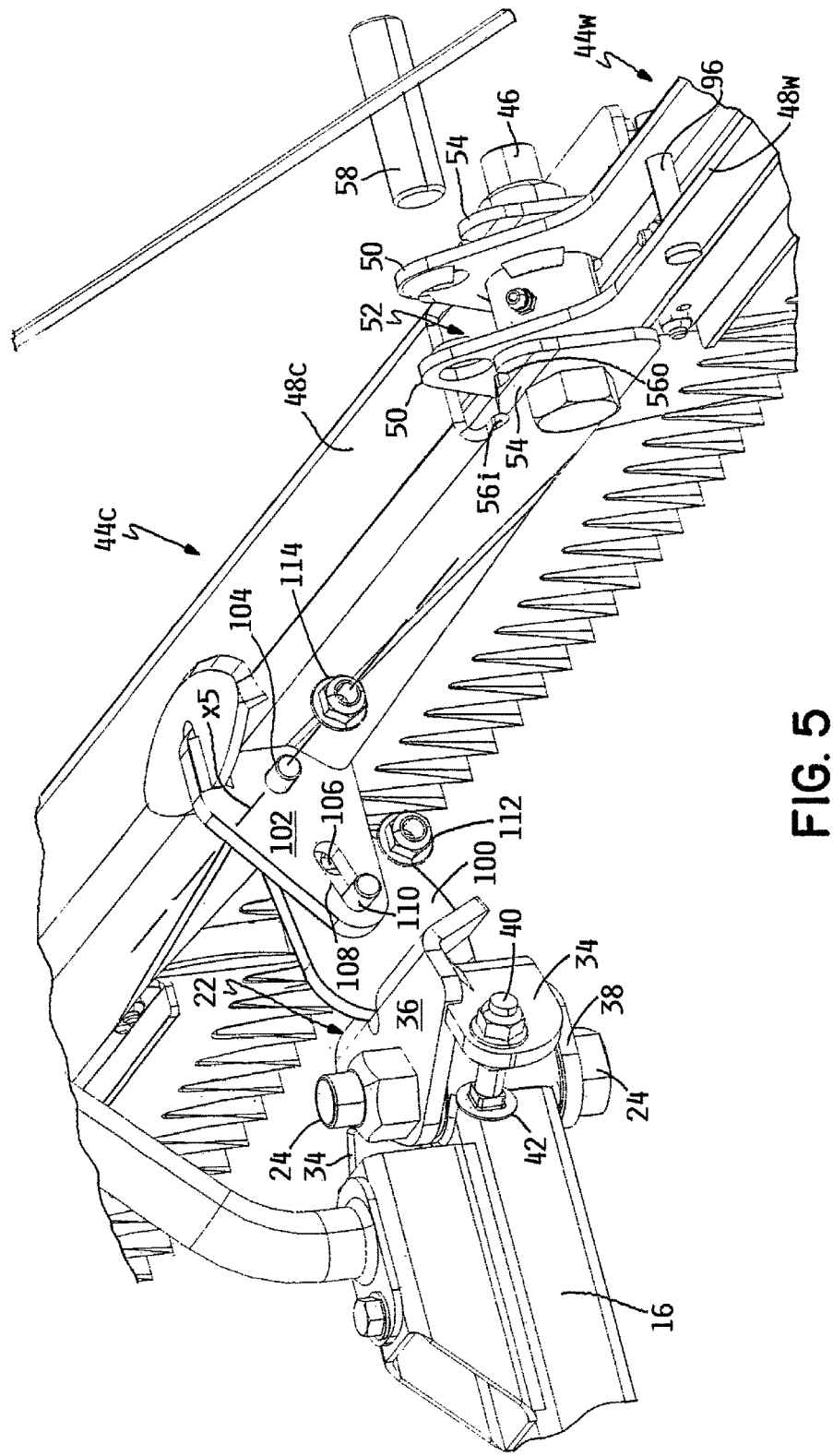
FIG. 5 is an enlarged perspective view of a portion of the grooming rake of FIG. 1, particularly illustrating the pivot connection forming the rear vertical pivot axis of the grooming rake, the adjustable mount that permits the rake head to be adjustably tilted relative to the pivot connection and the hitch arm, and the pivot connection between one outer end of the center rake section and an inner end of one wing rake section.

FIGS. 1 and 2 illustrate a grooming rake 2 according to a first embodiment of this invention. Rake 2 is attached to a suitable traction vehicle 4. Rake 2 trails vehicle 4 and is towed by vehicle 4 to groom and smooth a granular surface as vehicle 4 is driven over the granular surface. Rake 2 is particularly suited for grooming a granular surface comprising the sand contained in a sand trap or bunker of a golf course.

Referring first to FIG. 1, one suitable vehicle 4 with which rake 2 can be used comprises a Zero Radius Turn (ZRT) vehicle, also often referred to simply as a Z vehicle. Vehicle 4 has a frame 6 supported by three ground engaging wheels arranged in a tricycle configuration. The wheels include a pair of rear drive wheels 8 and a front caster wheel 10. Drive wheels 8 are independently powered and controlled so that one drive wheel 8 can be operated in a forward direction while the other drive wheel 8 is slowed, stopped or even operated in reverse. Forward operation of one drive wheel 8 on one side of frame 6 while simultaneously stopping or reversing drive wheel 8 on the other side of frame 6 causes vehicle 4 to spin about its turning axis in a very sharp or substantially zero radius turn.

A seat 12 is provided on frame 6 of vehicle 4 for carrying a seated operator. Twin pivotal control sticks 14 are provided adjacent seat 12 with each stick 14 controlling one drive wheel 8. When sticks 14 are advanced together forwardly out of their neutral position, both drive wheels 8 are operated forwardly to cause vehicle 4 to move forwardly. Steering is accomplished by advancing one stick 14 more than the other to rotate drive wheels 8 at different speeds. A zero radius turn can be achieved by advancing one stick 14 forwardly without advancing the other stick 14 or while pulling back on the other stick 14.

ZRT vehicles of the type utilized for vehicle 4 have long been used in rotary mowers. Thus, only a brief description of the principles of such a vehicle has been provided herein as one skilled in the art would understand how to build and operate such a ZRT vehicle.

As shown in FIGS. 2 and 3, rake 2 according to the first embodiment of this invention includes a hitch comprising an elongated hitch arm 16 having a front end and a rear end. The front end of hitch arm 16 is pivotally connected by a vertical hitch pin 18 to a portion of vehicle frame 6 for rotation of hitch arm 16 about a substantially vertical pivot axis $y_1$ relative to vehicle frame 6. The fit between the front end of hitch arm 16 and hitch pin 18 is sufficiently loose or has a partially spherical configuration to permit hitch arm 16 to additionally pivot about a substantially horizontal pivot axis $x_1$ through a limited up and down angular vertical pivot range. Upward and downward pivoting motion of hitch arm 16 about axis $x_1$ facilitates up and down pitching of rake 2 to allow rake 2 to better follow ground contours and to float or ride over any laterally extending bumps or ridges in the granular surface being groomed. In addition, upward pivoting motion of hitch arm 16 about axis $x_1$ towards the upper limit of the angular pivot range about axis $x_1$ lifts rake 2 completely up off the granular surface being groomed to place rake 2 into a transport position.

Pivot axes $y_1$ and $x_1$ of hitch arm 16 are preferably located longitudinally between the horizontal axis $x_2$ of rotation of front wheel 10 of vehicle 4 and the horizontal axis $x_3$ of rotation of rear wheels 8 of vehicle 4. However, pivot axes $y_1$ and $x_1$ of hitch arm 16 are substantially closer in a longitudinal direction to axis $x_3$ than to axis $x_2$. The Applicants have found that this location for pivot axes $y_1$ and $x_1$ of hitch arm 16 helps isolate the rake from up and down pitching motions and sudden acceleration of vehicle 4. This enables rake 2 to more stably remain in engagement with the granular surface than if axes $y_1$ and $x_1$ of hitch arm 16 were located at the rear of vehicle 4 behind axis $x_3$.

Rake 2 further includes a laterally extending rake head generally indicated as 20. As best shown in FIG. 5, rake head 20 includes a forwardly facing clevis 22 that receives a vertical pivot pin 24 carried on the rear end of hitch arm 16 for rotation of rake head 20 about a substantially vertical pivot axis $y_2$ relative to hitch arm 16. Pivot axis $y_2$ is located behind the rear end of vehicle frame 6 and substantially behind the rear edges of rear wheels 8 of vehicle 4. See FIG. 2.

The clevis 22 and pivot pin 24 structure that forms the pivot connection at pivot axis $y_2$ preferably has some device, e.g. one or more Belleville washers (not shown) surrounding pivot pin 24 and acting between rake head 20 and hitch arm 16, that imposes a frictional or spring load opposing rotation of rake head 20 relative to hitch arm 16. This load must be overcome before rake head 20 will pivot relative to hitch arm 16 about pivot axis $y_2$. This load is either absent from or greatly reduced in amount at pivot axis $y_1$ to allow the force generated by the interaction of the granular surface and rake 2 to preferentially pivot hitch arm 16 relative to vehicle 4 about pivot axis $y_1$ before rake head 20 pivots relative to hitch arm 16 about pivot axis $y_2$. The reason for this will be described in more detail hereafter.

Referring now to FIGS. 2, 3 and 6, the amount of bi-directional rotation permitted for hitch arm 16 relative to vehicle 4 about pivot axis $y_1$ is limited by a pair of flexible members, e.g. a pair of chains 26, extending between a mount 28 clamped to a central portion of hitch arm 16 and a bracket 30 carried on the rear end of vehicle frame 6. One of the links adjacent the lower end of each chain 26 is bolted to one of a pair of angled flanges 32 carried on mount 28 which flanges 32 are laterally set a short distance to either side of hitch arm 16. Each chain 26 then extends upwardly and rearwardly over hitch arm 16 with the link at the upper end of each chain 26 being bolted to the side of bracket 30 that is on the opposite side of hitch arm 16 from the side to which the lower end of each chain 26 is bolted. The pair of chains 26 will thus cross over one another in an X-shaped pattern. The effective length of each chain 26 can be adjusted by changing which link at the lower end of each chain 26 is bolted to the corresponding angled flange 32 on mount 28 of hitch arm 16. Chains 26 are adjusted in length to be long enough such that chains 26 have some slack when vehicle 4 is traveling straight ahead and hitch arm 16 is longitudinally aligned with the forward direction of motion of vehicle 4.

As most clearly shown in FIGS. 4 and 5, clevis 22 on rake head 20 includes a pair of forwardly projecting, laterally angled wings 34 on either side with wings 34 being positioned between the top wall 36 and bottom wall 38 of clevis 22. Wings 34 are positioned adjacent opposite sides of the rear end of hitch arm 16. Each wing 34 mounts a threaded stop in the form of a bolt 40 with the enlarged head 42 of bolt 40 pointing inwardly towards the adjacent side of the rear end of hitch arm 16. When rake head 20 is substantially perpendicular to hitch arm 16 as shown in FIG. 4, heads 42 of bolts 40 are preferably symmetrically spaced away from and are out of engagement with the opposite sides of the rear end of hitch arm 16. Such spacing is adjustable depending upon the degree to which bolts 40 are threaded through wings 34 on which they are mounted. Thus, the threaded stops formed by bolts 40 limit the amount of bi-directional rotation that is permitted for rake head 20 relative to hitch arm 16 about the pivot axis $y_2$.

Rake head 20 further includes a plurality of rake sections 44 that are operatively carried on hitch arm 16 by clevis 22 of rake head 20. Preferably, there are three rake sections 44, namely a center section $44_c$ and two wing sections $44_w$ on either side of center section 44c. During operation of rake 2, center section $44_c$ is rigidly secured to clevis 22. However, each wing section $44_w$ is pivotally connected by a longitudinally extending pivot pin 46 to the adjacent end of center section 44c. See FIGS. 3 and 9. Thus, during operation of rake 2, center section $44_c$ does not vertically move relative to clevis 22 to which it is affixed, but each wing section $44_w$ can pivot upwardly and downwardly in a laterally extending, vertical plane relative to center section 44c depending upon the contours of the granular surface being groomed, as will be described in more detail hereafter.

Each rake section 44 includes a frame that is in the form of, but is not limited to, an elongated substantially U-shaped channel member 48. The channel member $48_c$ of center section $44_c$ faces downwardly while the channel members $48_w$ of wing sections $44_w$ face upwardly. The inner ends of each side wall of each wing section channel member $48_w$ are extended upwardly to form a pair of ears 50 that project up through a cut away slot 52 in the top wall of the adjacent outer end of center section $44_c$. See FIG. 5. The width of each wing section channel member $48_w$ is slightly smaller than the width between the side walls of center section channel member 48c to allow the inner ends of wing section channel members $48_w$ to be closely nested within the outer ends of center section channel member $48_c$. This nesting is allowed by cut away slots 52 in the outer ends of the top walls of center section channel member $48_c$.

Figure 9:
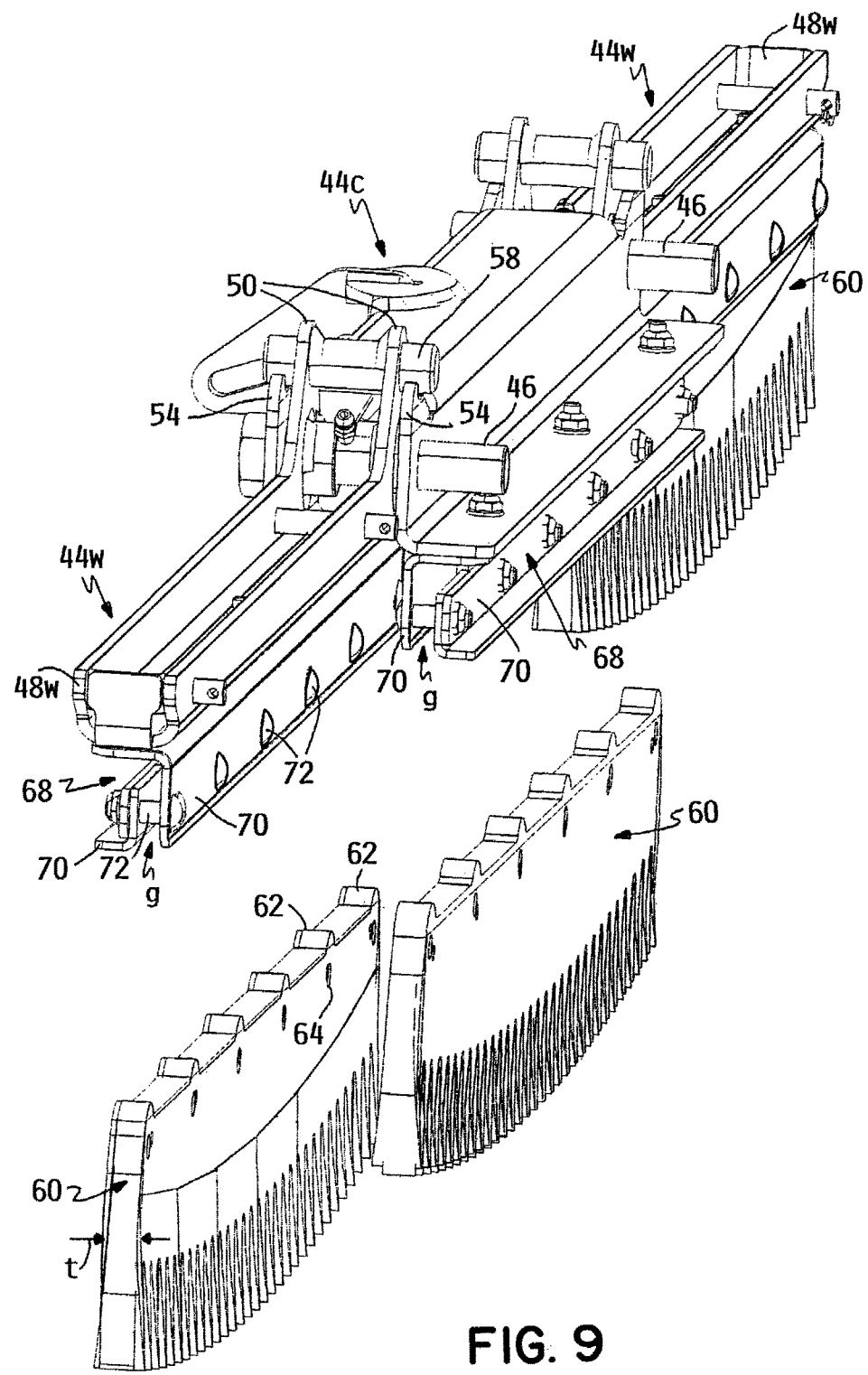
FIG. 9 is a perspective view of the rake head shown in FIG. 7, particularly illustrating the rubber trowel members of the center rake section and one wing rake section in exploded to more clearly show how the trowel members are mounted in the rake sections
Figure 10:
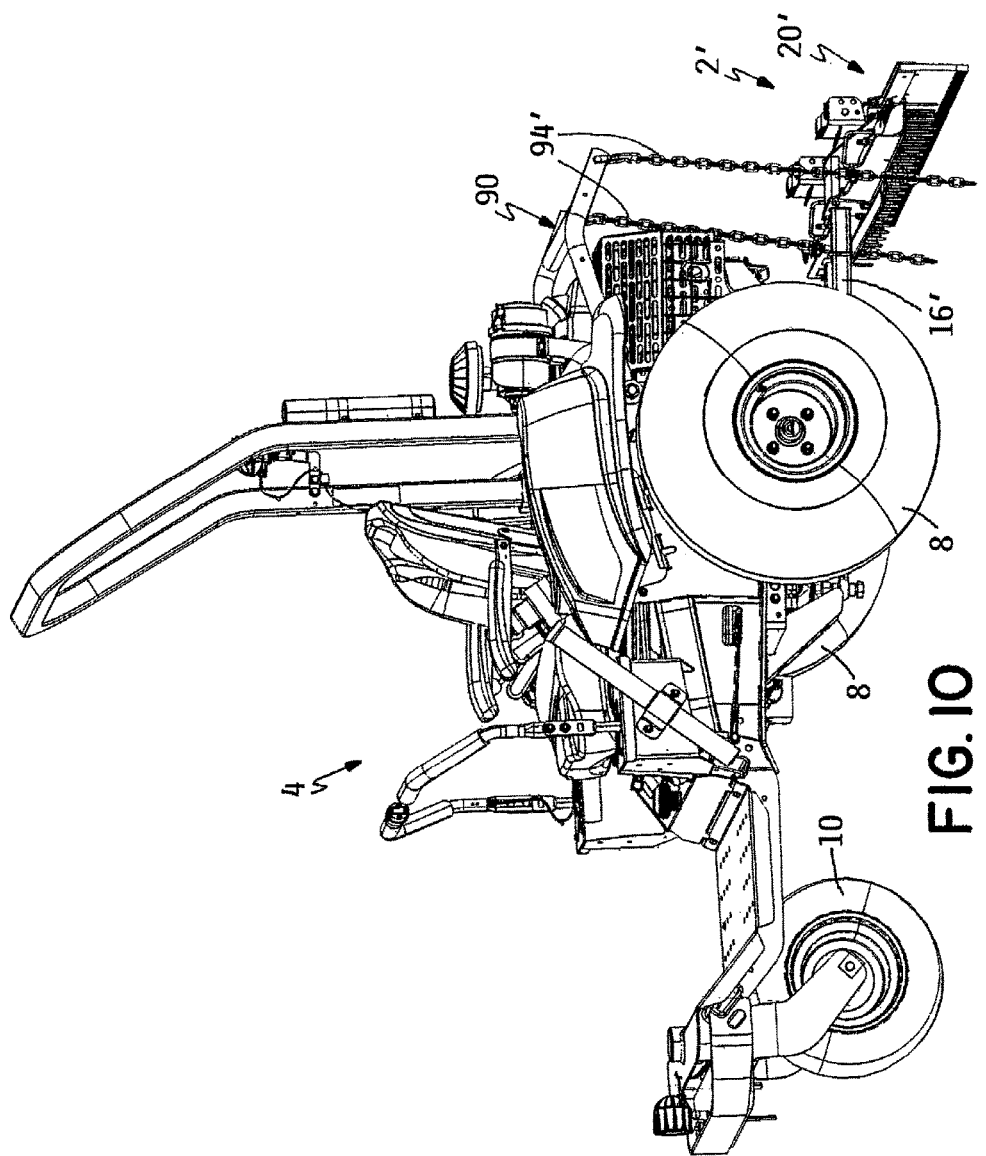
FIG. 10 is a perspective view of a second embodiment according to this invention of a grooming rake for grooming a granular surface, particularly illustrating the grooming rake attached to the rear of a Zero Radius Turn (ZRT) traction vehicle and showing the grooming rake in a lowered grooming position in contact with a granular surface comprising dirt.
Figure 11:
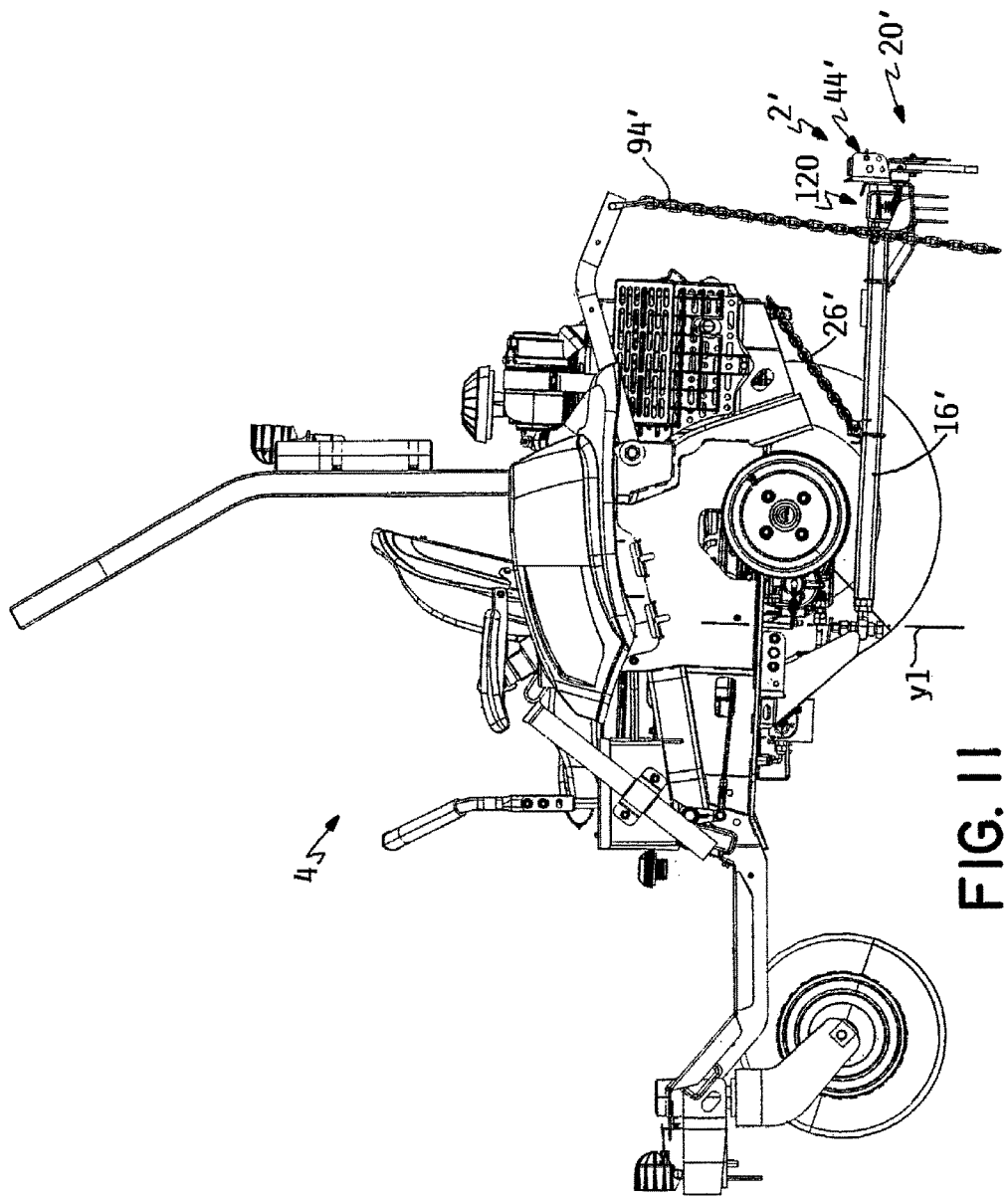
FIG. 11 is a side elevational view of the grooming rake of FIG. 10, particularly illustrating the vehicle with one of the rear drive wheels removed so as to show the single front substantially vertical pivot axis of the grooming rake.
Figure 12:
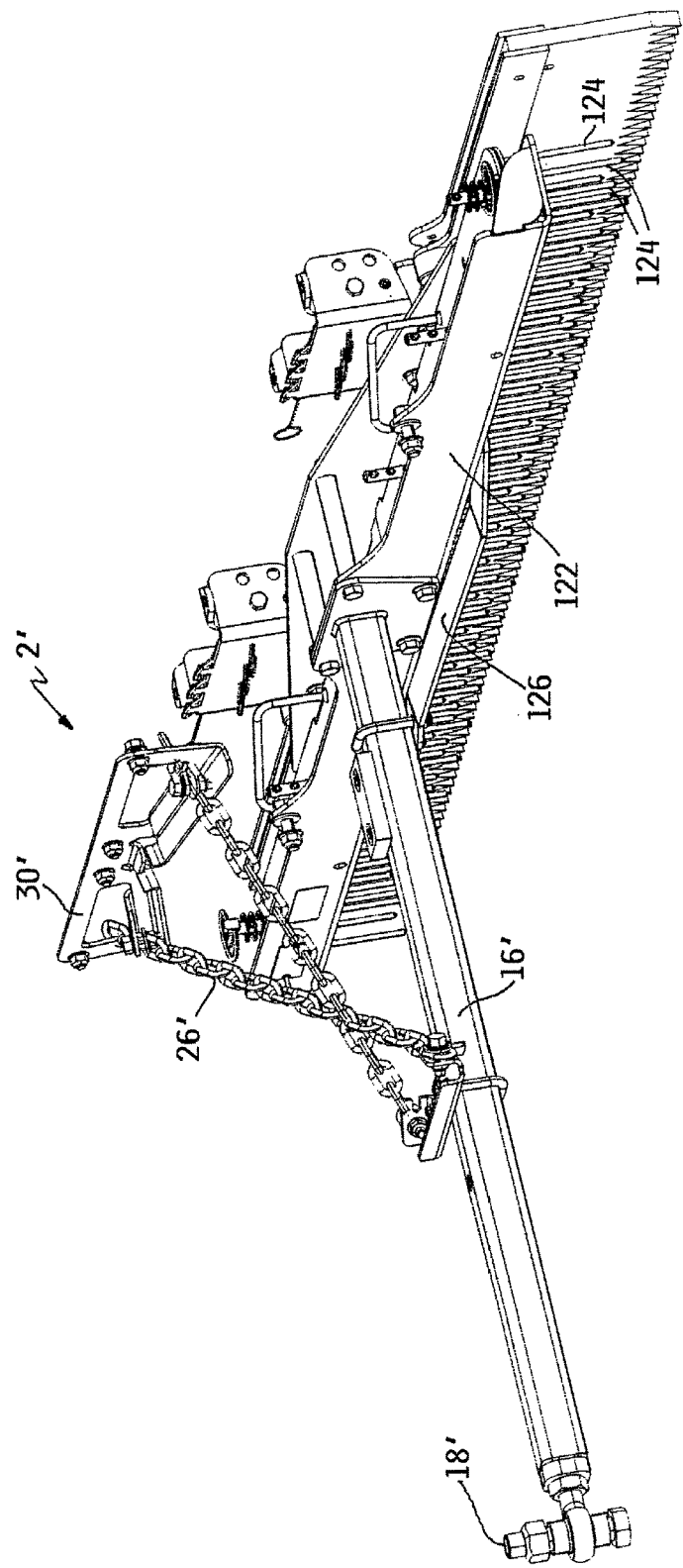
FIG. 12 is a perspective view of the grooming rake of FIG. 10.

As best shown in FIGS. 5, 6 and 9, the side walls of center section channel member $48_c$ are also extended upwardly adjacent the outer ends thereof to form a pair of spaced flanges 54 that are slightly wider than the distance between ears 50 at the inner end of wing section channel members $48_w$ such that ears 50 nest between flanges 54. Each flange 54 in each pair of flanges 54 has an upper edge that carries a pair of laterally spaced, upwardly facing notches 56, namely a laterally inner notch $56_i$ and a laterally outer notch $56_o$. Ears 50 on wing section channel members $48_w$ each carry a longitudinally extending stop pin 58 that is long enough to ride over the upper edges of flanges 54 of each pair of flanges 54. Stop pin 58 will be received in one of the laterally spaced notches 56, i.e. in either notch $56_i$ or in notch $56_o$, in each pair of flanges 54 to define the upper and lower limits of the vertical pivoting motion of wing sections $44_w$ relative to center section 44c.

A nominal operational grooming position of rake sections 44 is one in which wing sections $44_w$ are horizontally aligned with center section $44_c$ with wing sections $44_w$ and center section $44_c$ extending in the same substantially horizontal plane, i.e. wing sections $44_w$ are not pivotally tilted or canted relative to center section $44_c$. In this nominal grooming position as shown in FIG. 6, stop pins 58 are located between notches $56_i$ and $56_o$, though stop pins 58 are substantially closer to outer notch $56_o$ than they are to inner notch $56_i$. Wing sections $44_w$ can rotate or pivot downwardly about pivot pin 46 as shown by the arrow A in FIG. 6 in a relatively small angular range before stop pin 58 enters outer notch $56_o$ to prevent any further such downward pivoting. However, wing sections $44_w$ can rotate or pivot upwardly as shown by the arrow B in FIG. 6 through a much larger angular range before stop pin 58 enters inner notch $56_i$ and such upward pivoting is stopped. Wing sections $44_w$ are able to pivot in the directions A and B throughout the angular range provided by notches 56 as is needed for wing sections $44_w$ to conform themselves to the contours of the golf course bunker being groomed, as will be explained in more detail hereafter.

Each rake section 44 further includes a substantially vertical grooming trowel member 60 that is made of a flexible material, preferably a rubber material. Referring now to FIGS. 7-9, trowel member 60 comprises a substantially flat piece of rubber material that is substantially straight from side-to-side and that has a length l of approximately 31", a height h at the center thereof of approximately 4½", and a thickness t of approximately ½". Trowel member 60 may be substantially planar with a substantially uniform thickness t. In an alternative embodiment, trowel member 60 may be substantially planar except for an increasing thickness in a lower portion of trowel member 60 that causes the lower portion of trowel member 60 to flare outwardly to increase in thickness from the approximately ½" used in the top 2½" or so of trowel member 60 to approximately ¾" at the lower edge of the lower portion, i.e. the remaining 2½" or so, of trowel member 60. See FIG. 9 which best illustrates the flare in the thickness of the lower portion of trowel member 60. The upper edge of trowel member 60 is substantially straight except for a plurality of semi-circular tabs 62 that extend upwardly above each of a plurality of attachment holes 64 for trowel member 60. Tabs 62 provide sufficient strength and material around each attachment hole 64 to allow the attachment of trowel members 60 to channel members 48 of rake sections 44 without tearing or ripping of attachment holes 64.

The lower edge of trowel member 60 is serrated to provide a plurality of downwardly pointing, V-shaped grooming teeth 66. The tips of teeth 66 are spaced 1" apart such that there are thirty teeth over the approximately 31" length of trowel member 60. Teeth 66 are fairly long having a depth of approximately 1.75" from the tip to the root of each tooth. In addition, the tips of teeth 66 are preferably placed on a lower portion of the circumference of a circle having a 140" inch radius so that the tips of teeth 66 lie on a large circular arc as they extend from one end to the other of trowel member 60. Thus, teeth 66 in the center of trowel member 60, i.e. on the lowest portion of the arc, are lower than teeth 66 on either of the sides of trowel member 60. The significance of this arced configuration of the tips of teeth 66 will be described in more detail hereafter.

One type of rubber that can be used to form trowel member 60 is a natural rubber elastomer known as Dura-Shield AB-140. This material is hard enough (e.g. 40D on the Shore A scale) to permit some flexing of trowel member 60 during operation of rake 2 but to allow teeth 66 to remain generally upright while grooming most granular surfaces. Since teeth 66 are also fairly long as described above, this means that the roots of teeth 66 will usually be spaced up above the granular surface being groomed such that teeth 66 form a plurality of distinct narrow furrows in the granular surface. Teeth 66 are deep enough and the rubber material used in trowel member 60 is stiff enough such that teeth 66 avoid being laid completely over in a substantially face to face engagement with the top of the granular surface being groomed as rake 2 is moved over the granular surface.

Trowel members 60 described above are attached in any suitable fashion to channel members 48 of the various rake sections 44. One type of attachment is shown in FIG. 9 and comprises a downwardly facing U-shaped clamp 68 carried in some fashion on each channel member 48. Clamp 68 has a gap g formed between opposing clamp plates 70. The upper portion of a corresponding trowel member 60 is placed into gap g of clamp 68 such the upper portion of the trowel member 60 is sandwiched between clamp plates 70. A plurality of fasteners 72 can then be inserted through aligned holes in clamp plates 70 and attachment holes 64 along the upper portion of trowel member 60 to releasably secure trowel members 60 to channel members 48. When all three trowel members 60 are so secured to wing sections $44_w$ and center section $44_c$, trowel member 60 of center section $44_c$ is longitudinally staggered relative to trowel members 60 on wing sections $44_w$ and overlaps the ends of trowel members 60 on wing sections $44_w$ so that all three trowel members 60 groom a laterally continuous and unbroken swath of the granular surface during each pass of vehicle 4. See FIGS. 7 and 9.

A flexible tether 74, such as a rope or cable, is connected between the outer end of each wing section $44_w$ and the upper end of an upwardly and rearwardly extending post 76 on the rear portion of hitch arm 16 adjacent to the pivot axis $y_2$. As best shown in FIG. 6, the upper end of post 76 is T-shaped with each arm 78 of the T-shape extending laterally a short distance to either side of post 76 and hitch arm 16. Each arm 78 carries a series of attachment apertures 80 numbered 1-8. A selected attachment aperture 80 in each arm 78 receives a fastener, such as a bolt 82, for securing an eyelet on the upper end of one tether 74 to each arm 78. Tether 74 passes within and through a loop 84 at one end of a cable guide 86 that is also carried on arm 78. Cable guides 86 prevent tethers 74 from becoming fouled or snagged when rake 2 is placed into its transport position. Tethers 74 extend from their attachment points to arms 78 through cable guides 86 outwardly and downwardly to the outer ends of wing sections $44_w$. As best shown in FIG. 3, eyelets at the lower ends of tethers 74 are coupled by another fastener, such as a pin 88, to the outer ends of wing sections $44_w$ in the space between the side walls of wing section channel members $48_w$.

When rake head 20 is substantially perpendicular to hitch arm 16 during operation, the effective lengths of tethers 74 are chosen such that tethers 74 are both somewhat slack. Note that FIG. 3 does not show the upper ends of tethers 74 connected to fasteners 82 or the slack in tethers 74 for the sake of simplicity. The operator can change the attachment aperture 80 in arm 78 that is used to couple the upper end of tether 74 to arm 78 from one aperture 80 to another aperture 80 to selectively adjust the amount of the slackness in tether 74. At some point during a grooming operation when vehicle 4 is making very tight or substantially zero radius turns, tether 74 to wing section $44_w$ on the inside of the turn will become taut to cause wing section $44_w$ on the inside of the turn to pivot upwardly in the direction of arrow B about its pivot connection to center section 44c. The reason for this will be explained in more detail hereafter.

Referring again to FIGS. 1 and 2, vehicle 4 includes a lift and lower frame 90 that is pivotally mounted on an upper portion of vehicle frame 6 for rotation about a substantially horizontal pivot axis $x_4$. Lift and lower frame 90 includes two laterally spaced, rearwardly extending tubular side members 92 having downwardly angled rear ends. Two lift and lower chains 94 connect the rear ends of side members 92 to wing sections 44w of rake head 20 at connecting pins 96 located slightly outboard of the pivot connections of wing sections $44_w$ to center section 44c. See FIGS. 3 and 5 for the location of pins 96. An actuator, such as a hydraulic cylinder (not shown), extends between vehicle frame 6 and lift and lower frame 90 to pivot lift and lower frame 90 upwardly and downwardly about the pivot axis $x_4$.

Lift and lower frame 90 is used to move rake 2 between a lowered operational position in which rake sections 44 of rake head 20 are in engagement with the granular surface that is to be groomed and an upper transport position in which rake sections 44 have been substantially lifted up off the granular surface. FIGS. 1 and 2 illustrate lift and lower frame 90 in its lowered position on vehicle 4 with rake 2 in its lowered operational position. In this position, each lift and lower chain 94 will be somewhat slack so as not to interfere with the contour following ability of rake head 20 during a grooming operation.

To lift rake 2 into its upper transport position, the actuator connected to lift and lower frame 90 is operated to pivot lift and lower frame 90 upwardly about the axis $x_4$. The first portion of the angular range of motion of lift and lower frame 90 tightens lift and lower chains 94, the second portion of the angular range of motion pivots hitch arm 16 about the axis $x_1$ until a rubber stop pad 98 on the upper surface of hitch arm 16 abuts against an undersurface on vehicle frame 6, and a third and final portion of the angular range of motion then folds the two wing sections $44_w$ upwardly and laterally inwardly relative to center section $44_c$ to decrease the width of rake 2. Preferably, wing sections $44_w$ of rake 2 fold sufficiently far inwardly such that they do not substantially protrude laterally beyond the maximum width of vehicle 4. Thus, rake 2 in its upper transport position will not prevent vehicle 4 from passing through narrow openings of a size that vehicle 4 could have driven through had rake 2 been absent.

The operational characteristics of rake 2 described above when used on a ZRT vehicle 4 will now be described. To begin with, a primary use of rake 2 will be the grooming of the sand contained in a bunker on a golf course. Bunkers in older golf courses were often fairly expansive in size and usually somewhat flat. However, the trend in golf course design is to use bunkers that are much more highly contoured, often with somewhat flat surfaces in the middle of the bunkers but with fairly steeply angled or curved side walls that may be quite high. In addition, small highly contoured bunkers have become quite common. In concert with this decrease in size, the number of bunkers used on a typical course has dramatically increased. Thus, the owner or operator of a modern golf course is faced with the need to productively groom many smaller sized bunkers having a flat bottom or middle but with fairly steep and curved sides leading up to the bunker lip.

When rake 2 is in use for grooming a granular surface that is substantially flat across the swath of rake 2 and vehicle 4 is traveling straight ahead, rake 2 trails behind vehicle 4 with hitch arm 16 being substantially aligned with the forward direction of movement of vehicle 4 and with rake head 20 being substantially perpendicular to hitch arm 16. Let's suppose that vehicle 4 is now turned to one side in a gentle turn having a large or gentle turning radius. When this occurs, hitch arm 16 preferentially rotates about the pivot axis $y_1$ (due to the load that is imposed on pivot axis $y_2$ which load is absent from pivot axis $y_1$) so that the entire grooming rake, including hitch arm 16, becomes canted or tilted relative vehicle 4 towards the inside of the turn. In other words, in this condition characterized by preferential rotation of hitch arm 16, wing section $44_w$ that is on the inside of the turn comes closer to the rear wheel on the inside of the turn while wing section $44_w$ on the outside of the turn moves further away from the rear wheel on the inside of the turn, but with rake head 20 itself remaining substantially perpendicular to hitch arm 16. Maintaining the substantially perpendicular orientation of rake head 20 relative to hitch arm 16 during gentler turns by having hitch arm 16 preferentially pivot before rake head 20 provides a better grooming result than if rake head 20 is also substantially freely pivotable about pivot axis $y_2$. If this gentle turn is ended and vehicle 4 returns to straight ahead forward motion, hitch arm 16 and the rest of rake 2 rotates back to a centered position with respect to vehicle 4 in which hitch arm 16 is again aligned with the forward direction of motion of vehicle 4.

However, let's now assume that the turn to the side is not a gentle turn, but is a very sharp or zero radius turn occasioned by the fact that vehicle 4 is approaching the end of the bunker, the end of the bunker is narrow and is defined by a sharp curve therein, and vehicle 4 has to turn very tightly to reverse direction while remaining within the confines of the narrow curved end of the bunker. In this situation, as the turn begins, the first thing that happens is hitch arm 16 swings towards the inside of the turn as in a gentle turn. However, as the turn continues and is steepened, one of the motion limiting chains 26 between hitch arm 16 and vehicle frame 6 quickly becomes taut, thereby stopping any further rotation of hitch arm 16 about the pivot axis $y_1$. In addition, the crossing or X-shaped pattern in the motion limiting chains 26 causes the chain 26 that has become taut during the turn to counteract any tendency of hitch arm 16 and post 76 attached thereto to roll about the longitudinal axis of hitch arm 16. This helps prevent any unintended lifting of portions of the trowel member 60 of center section $44_c$ from the granular surface that such a rolling action might otherwise cause.

After one of the motion limiting chains 26 becomes taut during a turn and the turn continues and is further steepened, the force of the granular surface acting on trowel members 60 on rake head 20 overcomes the load on rake head 20 and pivots rake head 20 about the pivot axis $y_2$. This causes rake head 20 to then become further canted or tilted on hitch arm 16 such that wing section $44_w$ that is on the inside of the turn comes even closer to and quite near to the rear wheel on the inside of the turn while wing section $44_w$ on the outside of the turn moves even further away from the rear wheel on the inside of the turn. The canting or tilting of rake head 20 is eventually stopped by the action of one of the stops 40 on rake head 20 engaging against the side of hitch arm 16 that faces the inside of the turn. This engagement is needed to prevent rake head 20 from pivoting too far on hitch arm 16 to thus prevent wing section $44_w$ on the inside of the turn from hitting rear wheel 8 on the inside of the turn.

During this tight or zero radius turn, tether 74 to wing section 44w on the inside of the turn becomes taut because of its connection to post 76 somewhat before the engagement of stop 40 with hitch arm 16 ends the pivoting motion of rake head 20. When tether 74 becomes taut, it mechanically pulls up on the outer end of wing section $44_w$ on the inside of the turn to pivotally lift wing section $44_w$ on the inside of the turn up off the granular surface being groomed. This is desirable in such a turn to prevent wing section $44_w$ on the inside of the turn from pushing and leaving a ridge of sand behind it as this wing section actually moves rearwardly relative to the granular surface at the end of the tight or zero radius turn. Lifting up wing section $44_w$ prevents that wing section from pushing sand rearwardly and leaving that sand in a ridge or clump at the conclusion of the turn and as vehicle 4 resumes forward motion. Thus, the performance of rake 2 is enhanced when rake 2 is attached to a ZRT vehicle that is being operated at least at times in a zero radius turn fashion in a bunker or the like. Note that the X-shaped pattern of motion limiting chains 26, which helps prevent rolling of hitch arm 16 and of post 76 about the longitudinal axis of hitch arm 16 once one of the chains 26 becomes taut, ensures more consistent results in achieving proper lifting of wing section $44_w$ on the inside of the turn since post 76 is the anchor for the inner ends of tethers 74.

Another characteristic of rake 2 comes into play when rake 2 is being used to groom along the sides of a bunker at the junction between a substantially flat bottom portion of the bunker and a curved side wall of the bunker. The curved side wall of the bunker may itself be covered with sand or may be covered with turf or sod. Vehicle 4 can however be driven quite close to this junction or can straddle this junction such that wing section $44_w$ that is nearest the side wall of the bunker actually overlaps onto the side wall. Such wing section $44_c$ pivots upwardly in the direction of arrow B about its pivot connection to center section $44_c$ to become upwardly inclined or angled as it overlaps and engages the bunker side wall.

However, because of the flexibility of the rubber trowel member 60 and the fact that teeth 66 of trowel member 60 will remain substantially upright, wing section $44_w$ that overlaps the side wall will be unlikely to damage the bunker side wall, or the bunker lip at the top of the side wall, or any underlying liner that might have been placed on the side wall to help retain granular material thereon. This is in marked contrast to prior art grooming rakes having metallic grooming members that can dig in and damage these areas of the bunker. Accordingly, rake 2 is much less likely than known prior art rakes to damage a bunker even when vehicle 4 is driven closely along the junction of the bottom of the bunker and the side walls of the bunker.

Another desirable advantage is provided by the curved arc of teeth 66 of trowel member 60 along the lower edge of trowel member 60, particularly when used on wing sections $44_w$. Again, going back to the situation where vehicle 4 is closely driven along the junction between a bottom and a steeply curved side wall of the bunker, wing section $44_w$ will, of course, pivot upwardly about its pivot connection to center section $44_c$ such that at least the outer end of wing section $44_w$ is riding along some portion of the curved side wall. If teeth 66 along the lower edge of the trowel member were perfectly straight along the length 1 of the trowel member rather than being disposed in an arc, the inner side of wing section $44_w$ would ride on the bottom of the bunker while the outer side of wing section $44_w$ would ride on the side wall of the bunker. In many cases with a straight configuration to teeth 66, the teeth 66 in the center of wing section $44_w$ would be spaced by a gap above the granular surface in the bottom and side walls of the bunker due to the bridging effect caused by support of wing section $44_w$ only along its inner and outer sides. Wherever this gap occurs, wing section $44_w$ would not be able to effectively groom any underlying granular material.

However, with the arced or curved configuration of teeth 66 of trowel member 60 along the lower edge thereof, teeth 66 in the middle of wing section $44_w$ will be disposed vertically lower than if a purely straight configuration had been used. This lower disposition of teeth 66 in the middle of wing section $44_w$ causes such teeth 66 to now extend further down to reach and thus groom the underlying granular material. Thus, a grooming effect is achieved along substantially the entire length of wing section $44_w$ even when wing section $44_w$ is pivoted upwardly with its outer end riding on the curved side wall of the bunker. Again, this arced or curved configuration of teeth 66 provides better performance of rake 2 in grooming the granular material, i.e. the sand, found in the small highly contoured bunkers of today's golf courses.

Strictly speaking, the arced or curved configuration of teeth 66 of trowel member 60 is most needed on wing sections $44_c$ of rake head 20 as such wing sections are most likely to encounter the curved contours that give rise to the bridging effect where wing section $44_c$ is in contact with the granular material only at the inner and outer ends thereof. Thus, trowel member 60 used in center section $44_c$ could be shaped such that teeth 66 thereon were arranged in a straight substantially horizontal line along the lower edge of the trowel member. However, the arced or curved configuration can be optionally used even on center section 44c as illustrated in the drawings hereof. This would be advantageous for the sake of part commonality since differently shaped trowel members 60 would not be needed. In addition, when grooming in some bunkers, even center section 44c of rake head 20 might be subject to the bridging effect noted above when vehicle 4 is driven with one rear wheel 8 of vehicle 4 up partially on the side wall of the bunker and the other rear wheel 8 on the bottom of the bunker.

Some of the characteristics of rake 2 come into play during tight or zero radius turns of vehicle 4 and are thus most useful when rake 2 is coupled to a traction vehicle capable of zero radius turns. The characteristic that comes to mind in this regard is the automatic lifting of wing whatever wing section $44_w$ is located on the inside of the turn when vehicle 4 is executing a sharp or zero radius turn. The other characteristics, such as the bunker friendly nature of the rubber trowel members 60 used on rake sections 44 as well as the arced configuration of teeth 66 along the lower edge of the rubber trowel members 60, are useful even when vehicle 4 is not capable of zero radius turns. Thus, rake 2 is not intended to be limited to use with a ZRT vehicle unless the claims of this application require such a ZRT vehicle.

It could be desirable to be able to change the angle of rake head 20 relative to hitch arm 16 to adapt rake head 20 for more effective grooming in different conditions of the sand in the golf course bunkers or the like. For example, in some sand conditions it may be desirable for trowel members 60 to be substantially vertical while other sand conditions might be better groomed if trowel members are angled or toed either somewhat forwardly or rearwardly from a substantially vertical orientation of trowel members 60. Thus, an adjustable pivot connection is provided between clevis 22 and center section $44_c$ for this purpose. However, once a given adjusted pivotal position of rake head 20 is selected, the adjustable pivot connection is tightened on center section 44c such that center section 44c is rigid with hitch arm during a grooming operation.

Referring now to FIG. 5, the adjustable pivot connection comprises a first plate 100 rigidly secured to clevis 22 and a second plate 102 rigidly secured to center section $44_c$ of rake head 20. Portions of plates 100 and 102 overlap one another. Plate 102 is mounted on a pivot pin 104 on plate 100 such that plate 102 and center section $44_c$ of rake head 20 pivot about a substantially horizontal pivot axis $x_5$ to change the vertical attitude of rake head 20 relative to hitch arm 16. The overlapping portions of plates 100 and 102 include a plurality of vertically and longitudinally spaced holes 106 (one of which can be seen in FIG. 5) in plate 100 and an elongated slot 108 in plate 102. A threaded bolt 110 passes through a selected one of the holes 106 in plate 100 and through slot 108 in plate 102. A nut 112 (shown in exploded form with a similar nut 114 being used for pivot pin 104) is tightened on bolt 110 to rigidly clamp the two plates 100 and 102 together in an adjusted position about pivot axis $x_5$ to hold center section $44_c$, and thus the rest of rake head 20, in a pivotally adjusted position about axis $x_5$.

As shown in FIG. 5, rake head 20 is in its usual position in which trowel members 60 are substantially vertically upright. However, if bolt 110 is withdrawn from slot 108 and from the unseen hole 106 in which bolt 110 is currently received, then plate 102 can be rotated about pivot pin 104 in the direction of arrow C. Rotation of plate 102 in this direction will bring slot 108 into full alignment with the new hole 106 that can be partially seen through slot 108 in FIG.

5. If bolt 110 is then reinserted through this new hole 106 and through slot 108, nut 112 can then be retightened on bolt 110 to clamp plates 100 and 102 together again. However, in this adjusted position, rake head 20 will have been rotated in the direction of arrow C until trowel members 60 are angled slightly forwardly as they extend downwardly. Other unseen holes 106 are provided in plate 100 to provide other adjustments in which trowel members are angled either further forwardly or are angled rearwardly.

While such a pivotal adjustment of rake head 20 relative to hitch arm 16 is potentially desirable, the condition that will in all likelihood be most often used is the condition in which trowel members 60 are substantially vertical rather than being angled forwardly or rearwardly as they extend downwardly. Thus, the adjustable pivotal connection describes above could be dispensed with and rake head 20 could be fixed to clevis 22 in a single position with trowel members 60 extending substantially vertically downwardly.

A second embodiment of a grooming rake that can be used for grooming a granular surface is disclosed generally as 2' in FIGS. 10-14. The same reference numerals used to identify components of rake 2 will be used to identify components of rake 2' except that a prime suffix will be added to the reference numeral, e.g. rake 2' instead of rake 2, hitch arm 16' instead of hitch arm 16, etc. Instead of grooming a granular surface that comprises sand in golf course bunkers as was true of rake 2, rake 2' is intended primarily for grooming dirt surfaces, such as the dirt portions of the infields of baseball diamonds. Accordingly, rake 2' would most likely be used with a non ZRT traction vehicle, such as a Workman utility vehicle manufactured and sold by The Toro Company, although it could be used with a ZRT traction vehicle 4.

Like rake 2 described earlier herein, rake 2' includes a hitch arm 16' pivoting about the same pivot axis $y_1$ on vehicle 4. Hitch arm 16' can have limited bi-directional rotational motion about pivot axis $y_1$ as limited by motion limiting chains 26'. These features of rake 2' need not be described again as they are the same as those described for rake 2.

Rake 2' comprises a two part rake head 20' that is rotationally fixed to the rear end of hitch arm 16'. Thus, the pivot connection at the pivot axis $y_2$ is entirely missing from rake 2'. The two parts of rake head 20 comprise a laterally elongated nail drag 120 which is followed by a laterally elongated rake section 44'. Rake section 44' is a single section extending across the length thereof without having any pivotal wing sections. Rake section 44' includes a downwardly extending trowel member 60' along the length thereof. Trowel member 60' is made of the same rubber material as used for towel members 60 of rake 2. However, teeth 66' formed along the lower edge of trowel member 60' are differently shaped than teeth 66 in trowel members 60 used in rake sections $44_c$ and $44_w$ of rake 2.

Looking first at the nail drag portion of rake head 20', nail drag 120 includes an upper structural beam assembly 122 that mounts a plurality of downwardly extending pointed spikes or nails 124 whose lower ends may be sharpened into points that face the granular dirt surface that is to be groomed. Alternatively, the lower ends of nails 124 may originally be flat since even nails 124 whose lower ends are initially pointed will soon become flat as they are used due to wear. Nails 124 are disposed in a plurality of laterally extending rows. Nails 124 in one row are laterally staggered relative to nails 124 in a longitudinally preceding or trailing row. Three rows of nails 124 are shown though there could be a greater or lesser number of rows if so desired. Beam assembly 122 of nail drag 120 is rigidly fixed or secured to the rear end of hitch arm 16'. Cross bracing 126 can also be used between each side of the rear end of hitch arm 16' and each side of beam assembly 122 to further reinforce and rigidify nail drag 120 relative to hitch arm 16'.

Figure 13:
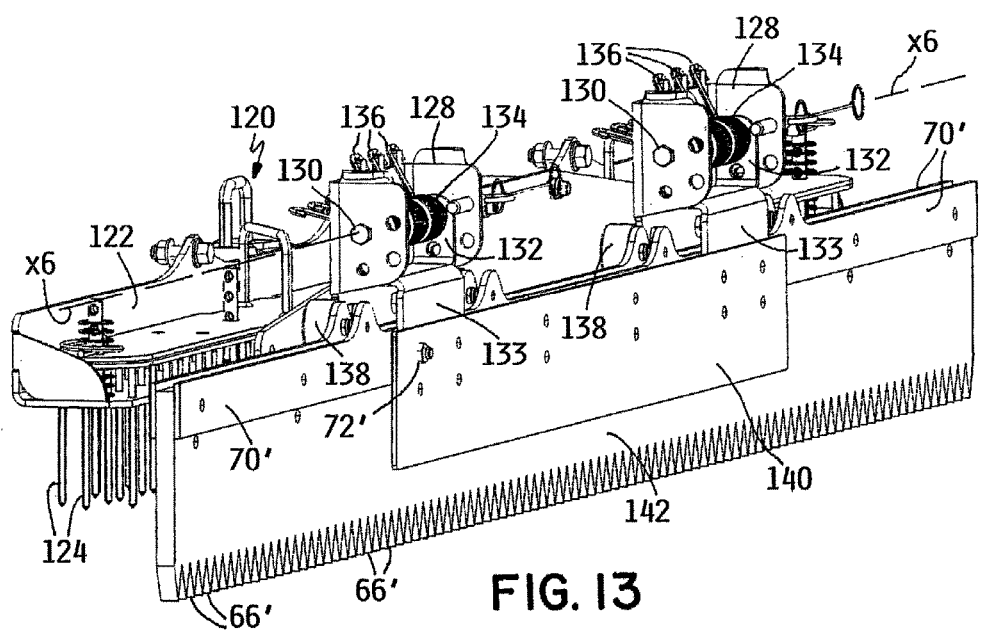
FIG. 13 is a perspective view of the grooming rake of FIG. 10 from the rear of the grooming rake, particularly showing the dirt pushing blade on the rear of the central or middle portion of the grooming rake.
Figure 14:
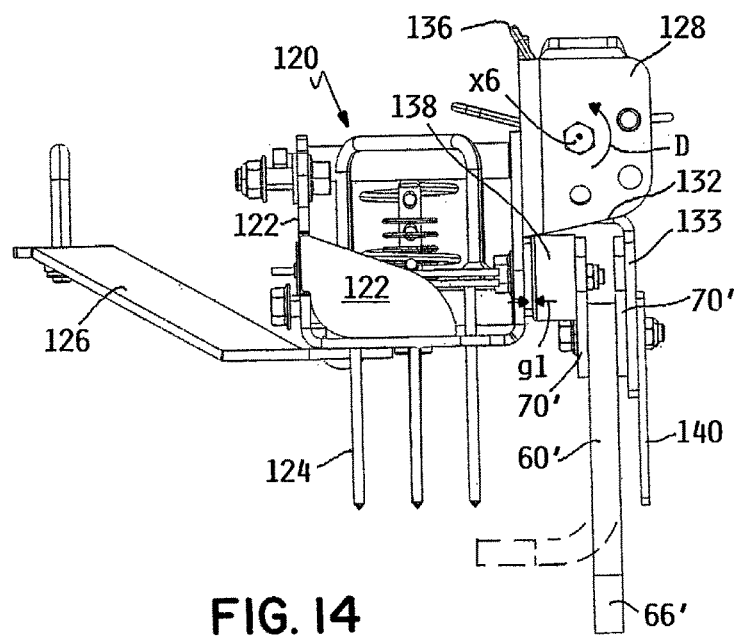
FIG. 14 is a side elevational view of the grooming rake of FIG. 10, particularly showing in phantom lines how the lower portion of the rubber trowel member folds forwardly during reverse motion of the vehicle to allow the lower edge of the dirt pushing blade to contact the dirt and to function as a bulldozer blade to push dirt in front of it as the vehicle travels in reverse.

Referring now particularly to FIGS. 13 and 14, beam assembly 122 of nail drag 120 includes a pair of U-shaped pivot mounts 128 at the rear thereof with the U-shape facing rearwardly. A horizontal pivot pin 130 is used within each pivot mount 128 with pivot pin 130 extending between the side walls of pivot mounts 128 such that a common horizontal rotational axis $x_6$ is formed by the aligned pivot pins 30. Rake section 44' contains a pair of upwardly extending U-shaped devises 132 that are pivotally received on pivot pins 130 to pivotally journal rake section 44' on the rear side of nail drag 120. Clevises 132 have downwardly extending rear walls 133 for mounting each clevis to rake section 44'. Thus, rake section 44' is permitted to have limited rotation about the horizontal pivot axis $x_6$ for a purpose to be described hereafter.

A plurality of torsion springs 134 are concentrically received around bushings that are placed around pivot pins 130. The upper ends 136 of torsion springs 134 are anchored on tabs formed on a top edge of a vertical base wall of pivot mounts 128. The lower ends (not shown) of torsion springs 134 are received between pivot mounts 128 and devises 132 to exert a torsional force on devises 132. Torsion springs 134 bias rake section 44' relative to nail drag 120 around pivot pins 130 in a direction indicated by the arrow D in FIG. 14 to maintain rake section 44' in a nominal operational grooming position in which rake section 44' as well as trowel member 60' attached thereto is substantially vertical.

Rake section 44' includes a pair of narrow clamping plates 70' between which a single rubber trowel member 60' is clamped by a plurality of fasteners 72' passing through holes in clamping plates 70' and holes in trowel member 60'. Some fasteners additionally pass through holes in the downwardly extending rear walls 133 of devises 132 for fastening clamping plates 70' and trowel member 60' to the devises to form rake section 44'. The most forward clamping plate 70' includes a plurality of compressible rubber cushions or bumpers 138 on the front side thereof. Bumpers 138 face a portion of beam assembly 122 of nail drag 120. However, when rake section 44' is in its substantially vertical operational grooming position, bumpers 138 are spaced by small gaps $g_1$ away from beam assembly 122.

Trowel member 60' of rake section 44' is serrated along its lower edge to have a plurality of downwardly extending, V-shaped teeth 66' formed thereon. However, such teeth are substantially shorter in height than teeth 66 described in trowel members 60 of rake 2. While trowel member 60' is itself substantially greater in height than trowel member 60, i.e. 5.75" high as opposed to 4½" high, teeth 66' of trowel member 60' are substantially shorter from tip to root than teeth 66, i.e. 1" as opposed to 1.75". In addition, such teeth 66' are not arranged in an arced or curved configuration. The tips of all teeth 66' in trowel member 60' are disposed to touch a common horizontal line.

The final component of rake section 44' comprises a rigid, rectangular plate 140 that extends downwardly from the top of rake section 44' over a substantial majority of the height of trowel member 60' but not over the entire height of trowel member 60'. As can be seen in FIG. 14, the approximately bottom one quarter (25%) to one third (33%) of the height of trowel member 60', including the portion occupied by serrated teeth 66', is left uncovered below plate 140. In addition, plate 140 extends over the approximately the central or middle one half (50%) of the width of rake section 44', though plate 140 could extend over more of or substantially all of the width of rake section 44'. Plate 140 acts as a bulldozer blade when rake 2' is in contact with the granular surface being groomed and vehicle 4 is operated in reverse as will be described in more detail hereafter.

In its usual grooming mode with vehicle 4 being operated in a forward direction, rake 2' will be lowered by lift and lower frame 90 until it comes into engagement with the granular surface to be groomed. In the case of rake 2', the rubber material is flexible enough so that the lower portion of trowel member 60' including teeth 66' will bend or somewhat flex out behind rake section 44' until nails 124 on nail drag 120 are low enough to engage against the granular surface. As vehicle 4 drives in a forward direction, nails 124 on nail drag 120 scarify and disturb the granular surface to break up any hard or compacted portions of the surface. Then, the trailing rake section 44' and its rubber trowel member 60' smoothes over the broken up granular surface in the same pass of vehicle 4 across the granular surface. This is more productive than using a nail drag to scarify the granular surface in a first pass of the vehicle and then using a smoothing implement such as a trowel member or brush to smooth the surface in a second pass as is normally done in the art.

In addition, vehicle 4 can be operated in reverse to accomplish an entirely different grooming operation on the granular surface using rake 2', namely pushing raised sections or piles of granular material from one place to another in the manner of a bulldozer blade. When vehicle 4 is operated in reverse, the force of the granular material acting against the lower edge of trowel member 60' will cause rake section 44' to pivot about the horizontal pivot axis $x_6$ in a direction that rotates trowel member 60' in a clockwise direction in FIG. 12 about pivot axis $x_6$. This clockwise pivoting action continues only for a short distance until rubber bumpers 138 on the front of rake section 44' engage against beam assembly 122 of nail drag 120 and become fully compressed.

Then, the force of the granular surface acting on the lower edge of trowel member 60' actually bends or folds the lower portion of trowel member 60', namely the strip 142 of trowel member 60' that lies beneath the lower edge of plate 140, forwardly as indicated in phantom in FIG. 14. The strip 142 of trowel member 66' can fold forwardly enough that the lower edge of plate 140 is able to drop down into engagement with the granular surface. At this point, the continued reverse motion of vehicle 4 causes plate 140 to act as a pushing blade in the manner of a bulldozer blade to push the granular material in front of it as long as vehicle 4 continues to move rearwardly. After the reverse motion of vehicle 4 is stopped and vehicle 4 resumes forward motion, the biasing on rake section 44' provided by torsion springs 134 and by whatever force has been built up in bumpers 138 allows rake section 44' to reset itself into its usual operational position in which trowel member 60' extends substantially vertically downwardly over its entire height and is no longer partially folded forwardly.

The ability to use rake 2' as a pushing blade like a bulldozer blade means that the purchaser or operator of rake 2' need not purchase another attachment purely for the purpose of redistributing portions or piles of granular material from one location on the granular surface to another location. All the operator need do is to operate vehicle 4 in reverse until plate 140 at the back and center of rake section 44' brings its lower edge into engagement with the granular surface to thereafter function as a pushing blade. This obtains another use from the same implement and is more cost effective than having to maintain another implement just to provide a bulldozer blade.

Finally, many grooming and smoothing operations of the types conducted by rakes 2, 2' are often most effectively accomplished when vehicle 4 is traveling at a forward ground speed that is less than its nominal maximum forward ground speed. However, many operators wish to accomplish their work as quickly as possible and consequently sometimes operate their vehicles 4 at forward ground speeds higher than those which give the best grooming and smoothing results. Accordingly, as shown in FIGS. 15-18, a further optional feature of vehicle 2 is the use of a speed limiting system 150 for vehicle 4 that automatically sets or establishes a lowered maximum forward ground speed, namely a forward ground speed that is lower than that which would otherwise be obtainable by the operator during forward motion of vehicle 4, whenever rakes 2, 2' are lowered from their transport positions and are put into their lowered grooming positions. This forces the operator to observe the lowered maximum forward ground speed at which rakes 2, 2' work most effectively and prevents the operator from overriding such lowered maximum forward ground speed. Speed limiting system 150 would usually be set and adjusted by a supervisor to establish whatever lowered maximum forward ground speed that the supervisor, rather than the operator, deems acceptable.

Speed limiting system 150 works by limiting how far forwardly the operator can push pivotal control sticks 14 when operating vehicle 2 in a forward direction of motion. The ground speed of vehicle 4 is directly related to the degree of forward pivotal motion of sticks 14 out of neutral positions thereof. The further forwardly sticks 14 are pushed from neutral, the faster the forward ground speed of vehicle 4, at least until a maximum forward position of each stick 14 is reached. When speed limiting system 150 is used and rakes 2, 2' are in their raised transport positions, there is no limit on how far control sticks 14 can be pushed forwardly with control sticks 14 being operable through their usual full range of forward pivotal motion as if speed limiting system 150 were not present. However, when rakes 2, 2' have been lowered into their grooming position, a pair of stops are interposed in front of control sticks 14 to intercept control sticks 14 before they reach the end of their full range of forward pivotal motion, thus limiting the maximum forward ground speed of vehicle to a value something less than its nominal or usual value.

A ZRT vehicle 4 has two control sticks 14 to control a pair of independent traction drives, such as two independent hydro motors or hydrostatic transmissions, which are coupled to the two rear drive wheels 8. Thus, speed limiting system 150 has two identical left and right sub-systems 152 that are used in conjunction with each control stick 14. Since each sub-system 152 is the same whether used on the left or right side of vehicle 4, a description of one sub-system 152 will suffice to describe the other.

Each sub-system 152 includes a speed limiting member 154 that is rotatably journalled on a fore-and-aft pivot shaft 156 that is fixedly attached to vehicle frame 6. Member 154 is in the shape of a short cylindrical bushing and is located forwardly of one of the control sticks 14. Control stick 14 is pivotal about a laterally extending pivot shaft 158 such that control stick 14 can pivot out of its neutral position forwardly towards member 154 in the direction of arrow E in FIG. 16. Member 154 is pivotal or rotatable about its pivot shaft 156 in a lateral plane that is perpendicular to the longitudinal fore-and-aft plane in which control stick 14 pivots. For example, member 154 pivots in the direction of arrow F in FIG. 16.

Figure 16:
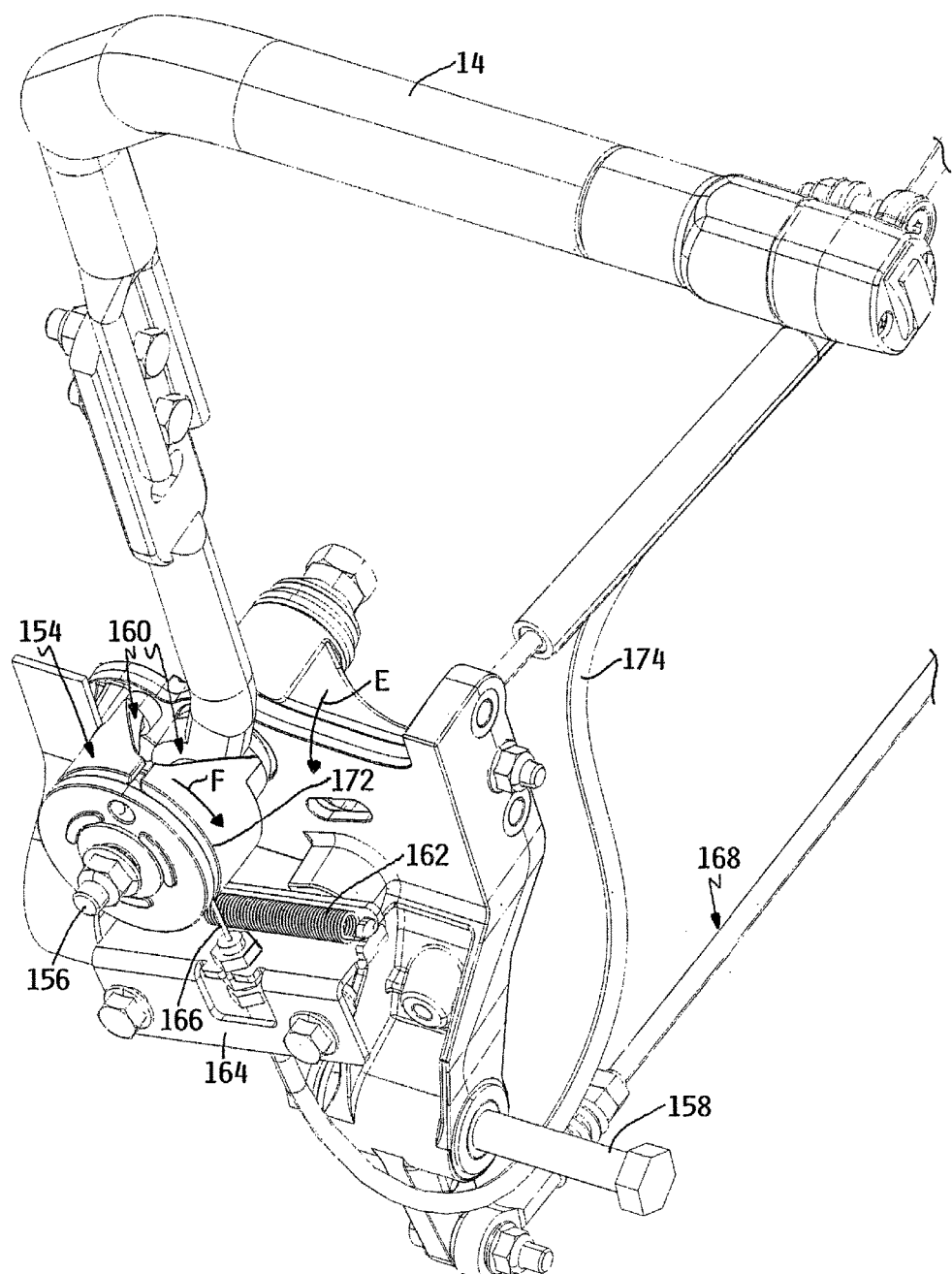
FIG. 16 is a perspective view of a portion of the speed limiting system of FIG. 15, particularly illustrating a speed limiting member in a first rotary position thereof in which the member is disposed when the grooming rake is in a raised transport position.

Referring further to FIG. 16, the rear side of member 154 has a V-shaped slot 160 that is normally laterally aligned with control stick 14. Slot 160 is able to receive control stick 14 therein and is deep enough to allow control stick 14 to have its full range of forward motion. A biasing spring 162 extends between member 154 and a bracket 164 on frame to normally bias member 154 into the position shown in FIG. 16. Member 154 is retained in this position by stops (not shown) on member 154 and bracket 164 that engage one another when the FIG. 16 position is reached. When slot 160 is aligned with control stick 14 as shown in FIG. 16, there is no limit on how far forwardly control stick 14 can be pushed. Control stick 14 can be pushed as far forwardly into slot 160 in the direction of arrow E as control stick 14 would previously have been able to be pushed had member 154 not been present and there is no limitation on the maximum forward ground speed of vehicle 4. The FIG. 16 position of member 154 is the position that member 154 occupies whenever rakes 2, 2' are in their raised transport positions.

Figure 15:
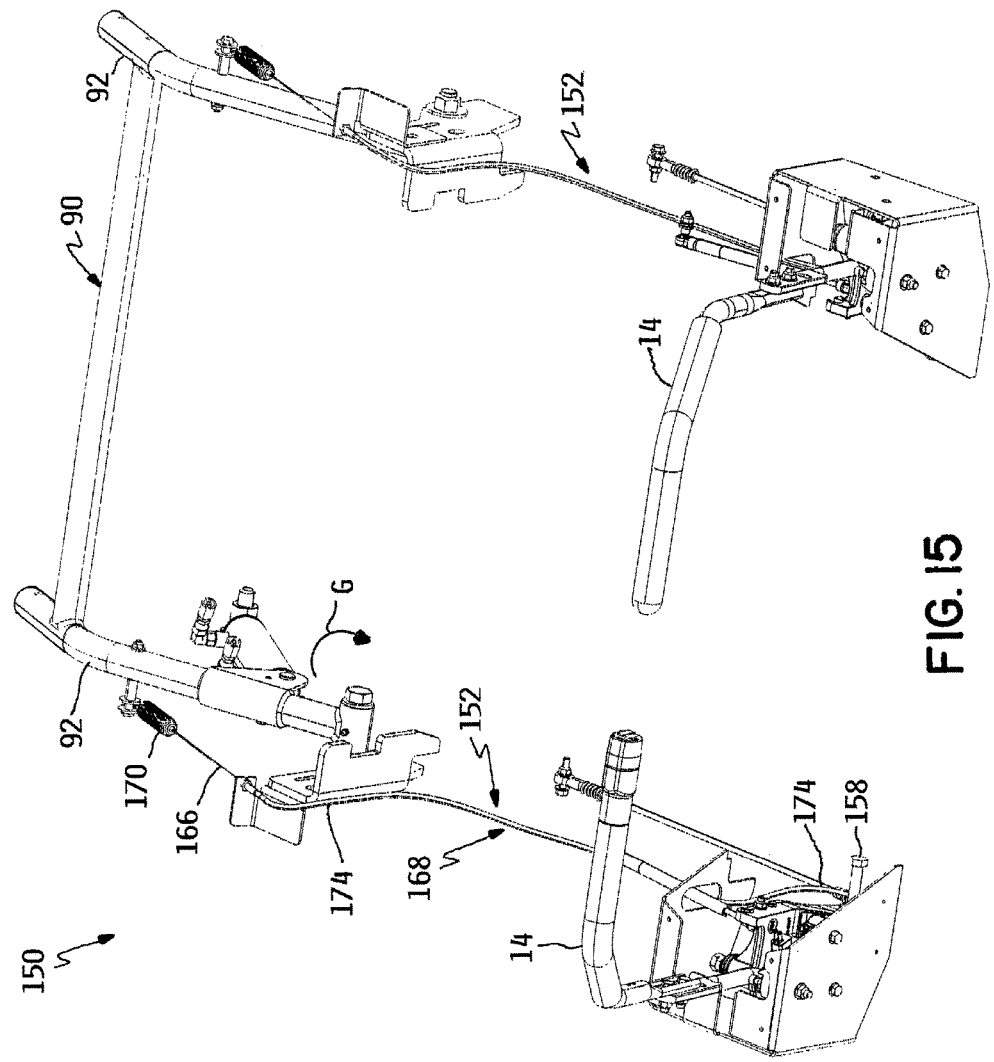
FIG. 15 is a perspective view of a speed limiting system that can be used with the vehicle of FIG. 1 to automatically limit the maximum forward ground speed of the vehicle when the grooming rake is in a lowered grooming position in contact with a granular surface comprising sand.

Member 154 is linked by the inner wire 166 of a Bowden cable 168 to one of the side members 92 of lift and lower frame 90. The rear end of inner wire 166 is coupled to side member 92 through a spring 170 as shown in FIG. 15. As shown in FIG. 16, the front end of inner wire 166 is coupled to member 154 in a groove 172 provided therefor in the front side of member 154. When lift and lower frame 90 is pivoted downwardly as shown by the arrow G in FIG. 15 to lower whatever rake 2 or 2' is carried thereby into its lowered grooming position, inner wire 166 is pulled rearwardly through the fixed outer sheath 174 of Bowden cable 168 to thereby rotate member 154 in the direction of arrow F in FIG. 16. This rotation occurs for an angular arc that is sufficiently large to rotate slot 160 out of alignment with control stick 14 and to bring a threaded stop 176 on member 154 into alignment with control stick 14 as best shown in FIG. 17.

Figure 17:
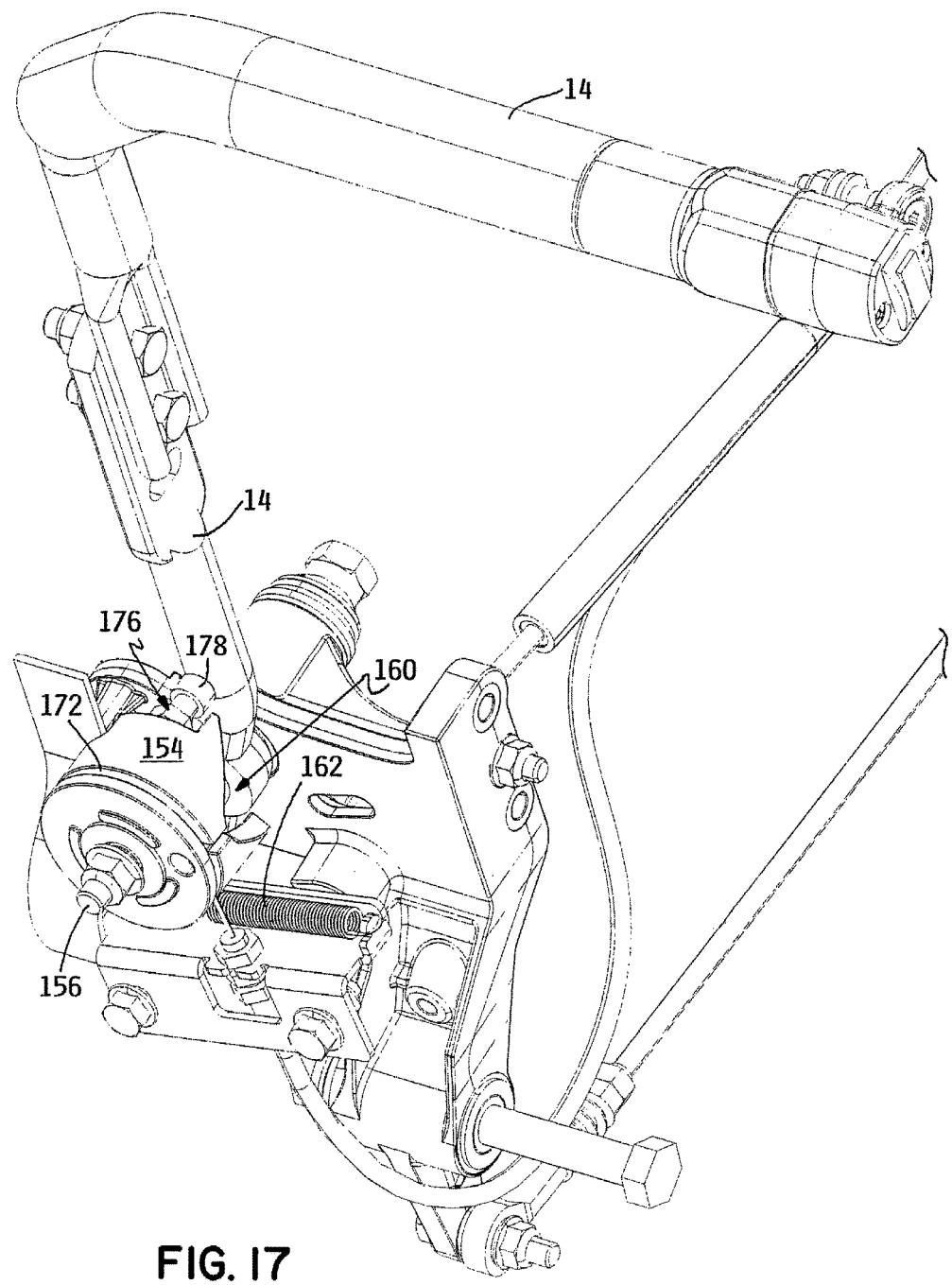
FIG. 17 is a perspective view similar to FIG. 16, but showing the speed limiting member in a second rotary position thereof in which the member is disposed when the grooming rake is in the lowered grooming position.
Figure 18:
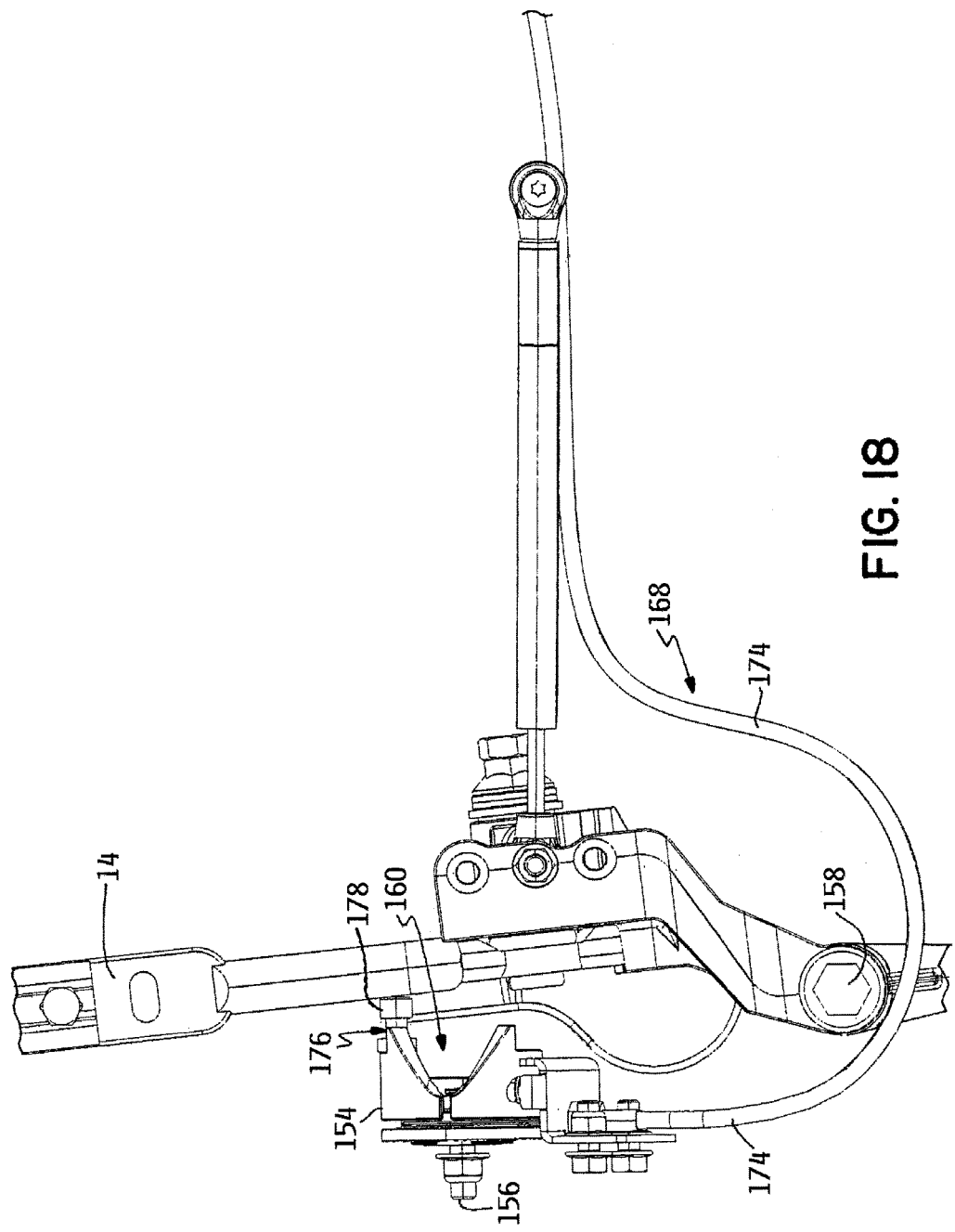
FIG. 18 is a side elevational view of the speed limiting member in the second rotary position thereof.

In the position shown in FIG. 17, the head 178 of stop 176 is spaced from control stick 14 when control stick 14 is in its neutral position by a predetermined gap. The size of the gap can be selectively adjusted by how far one threads stop 176 into or out of member 154. The gap allows some forward pivotal motion of control stick 14, but head 178 of stop 176 intercepts control stick 14 before the end of its full pivotal forward stroke and to limit the forward stroke of control stick 14. This limits the maximum forward ground speed to a value lower than that obtainable when rakes 2, 2' were elevated into their transport positions and to a value that was determined by size of the gap originally set between stop 176 and the neutral position of control stick 14. The operator simply cannot operate vehicle 2 faster than the forward ground speed that occurs when control stick 14 engages with stop 14. Thus, the operator is forced to use the lowered maximum forward ground speed that is determined by the setting of stop 176 and should obtain the best possible grooming and smoothing results assuming stop 176 was properly set. When rakes 2, 2' are raised into their transport positions, inner wire 166 is pushed back forwardly through sheath 174 and spring 162 helps bias member 154 back into its FIG. 16 position.

Speed limiting system 150 is durable, low cost and effective in forcing the operator to conduct grooming operations at lower speeds than he or she might otherwise use. It has no effect on the forward speed of operation of vehicle 4 when rakes 2, 2' are in their transport positions or on the usual range of reverse speeds. Use of system 150 is optional to vehicle 4 and need not be built as part of vehicle 4. In addition, while particularly useful in vehicles 4 conducting grooming and smoothing operations on granular surfaces, system 150 could be used on other vehicles for conducting other ground grooming or working operations or on other ZRT vehicles generally.

The various embodiments of rakes 2, 2' and vehicles 4 with which rakes 2, 2' can be used are only intended to be illustrative examples of what falls within the scope of this invention. Various other modifications of this invention will be apparent to those skilled in the art. For example, a pair of rigid members, one of which has a pin received in a slot in the other, could be used in place of each flexible tether 74. In this design, the pin in the one rigid member hitting or abutting one end of the slot in the other rigid member to prevent any further extension in length of the rigid members would equate to tautness in tether 74. Accordingly, this invention is to be limited only by the appended claims.

The invention claimed is:

1. Apparatus for smoothing a granular ground surface, which comprises:
   (a) a vehicle having a vehicle frame that carries at least three ground engaging wheels for supporting the vehicle for rolling over the granular ground surface, the ground engaging wheels including at least one front wheel rotatable about a front horizontal axis of rotation on the vehicle frame and at least one rear wheel rotatable about a rear horizontal axis of the rotation on the vehicle frame; and
   (b) a grooming rake, which comprises:
      (i) a hitch having a front end and a rear end, the front end of the hitch having a first pivot connection to the vehicle frame to allow the hitch to rotate relative to the vehicle frame about a first substantially vertical pivot axis;
      (ii) a rake head that supports at least one laterally extending grooming member that engages the granular surface to smooth the granular surface as the vehicle traverses over the granular surface, the rear end of the hitch having a second pivot connection to the rake head to allow the rake head to rotate relative to the hitch about a second substantially vertical pivot axis;
      (iii) wherein the second pivot connection includes at least one member for imposing a load on the rake head that opposes rotation of the rake head about the second substantially vertical pivot axis which load is greater than any load acting on the first pivot connection that opposes rotation of the hitch about the first substantially vertical pivot axis, and wherein a force of the granular surface acting on the grooming member during turns of the vehicle causes the hitch to first rotate relative to the vehicle frame about the first substantially vertical pivot axis before the force causes the rake head to rotate relative to the hitch about the second substantially vertical pivot axis;
      (iv) wherein the grooming member comprises a downwardly extending, substantially vertical, flexible rubber trowel member having a serrated lower edge formed by a plurality of downwardly extending teeth, wherein the downwardly extending teeth are cut into the rubber trowel member or integrally formed as part of the rubber trowel member such that the teeth are an inseparable portion of the rubber trowel member; and (v) further including first and second substantially rigid stops carried on one of the hitch and the rake head, each stop being physically spaced away from the other of the hitch and the rake head by a gap when the rake head extends substantially perpendicularly to a longitudinal axis of the hitch, wherein rotation of the rake head in a first direction about the second substantially vertical pivot axis will cause the first stop to close the gap to be brought into engagement with the other of the hitch and the rake head and will cause the second stop to increase the gap to move further away from the other of the hitch and the rake head to thereby limit the rotation of the rake head in the first direction about the second substantially vertical pivot axis; and wherein rotation of the rake head in a second opposite direction about the second substantially vertical pivot axis will cause the second stop to close the gap to be brought into engagement with the other of the hitch and the rake head and will cause the first stop to increase the gap to move further away from the other of the hitch and the rake head to thereby limit the rotation of the rake head in the second opposite direction about the second substantially vertical pivot axis.

2. The apparatus of claim 1, wherein the first pivot connection is further configured to permit the hitch to rotate relative to the vehicle frame about a substantially horizontal pivot axis.

3. The apparatus of claim 1, wherein the first pivot connection is between the front and rear horizontal axes of wheel rotation on the vehicle frame but is closer to the rear horizontal axis than to the front horizontal axis and the second pivot connection is behind the vehicle frame.

4. The apparatus of claim 1, further including a pair of flexible members attached between the hitch and the vehicle frame with the flexible members being slack when the vehicle is traveling straight ahead in a forward direction of motion and the hitch is aligned with the forward direction of motion of the vehicle, and wherein one flexible member becomes taut while the other flexible member remains slack when the vehicle turns to one side to limit the rotation of the hitch about the first substantially vertical pivot axis.

5. The apparatus of claim 1, wherein the rake head is fixed to the hitch during a grooming operation such that an angular attitude of the rake head about a substantially horizontal pivot axis through the rake head does not change during the grooming operation.

6. The apparatus of claim 5, wherein the rake head is selectively adjustable about the substantially horizontal pivot axis through the rake head to selectively vary the angular attitude of the rake head between different ones of a plurality of adjusted positions thereof, whereby the rake head can be adjusted such that the grooming member extends substantially vertically downwardly or can be selectively disposed in forwardly or rearwardly inclined orientations.

7. Apparatus for smoothing a granular ground surface, which comprises:
(a) a vehicle having a vehicle frame that carries at least three ground engaging wheels for supporting the vehicle for rolling over the granular ground surface, the ground engaging wheels including at least one front wheel rotatable about a front horizontal axis of rotation on the vehicle frame and at least one rear wheel rotatable about a rear horizontal axis of the rotation on the vehicle frame; and
(b) a grooming rake, which comprises:
  (i) a hitch having a front end and a rear end, the front end of the hitch having a first pivot connection to the vehicle frame to allow the hitch to rotate relative to the vehicle frame about a first substantially vertical pivot axis;
  (ii) a rake head that supports at least one laterally extending grooming member that engages the granular surface to smooth the granular surface as the vehicle traverses over the granular surface, the rear end of the hitch having a second pivot connection to the rake head to allow the rake head to rotate relative to the hitch about a second substantially vertical pivot axis, wherein the rake head has three sections comprising a center section and two pivotal wing sections on either side of the center section with each section having its own distinct laterally extending grooming member, the wing sections being pivotal relative to the center section about longitudinally extending, substantially horizontal pivot axes such that each wing section can pivot up and down relative to the center section in a vertical plane to overlap and follow the contours of curved ground side walls in or adjacent to the granular ground surface being groomed; and
  (iii) wherein the vehicle is capable of substantially zero radius turn operation, and further including a pair of members extending between laterally outboard portions of the wing sections and the hitch, wherein a first one of the pair of members extends between the laterally outboard portion of a first one of the wing sections and the hitch and a second one of the pair of members extends between the laterally outboard portion of a second one of the wing sections and the hitch, the members being configured to be in a collapsed or slack condition in which the members are incapable of imposing an upward lifting force on the wing sections when the vehicle is traveling straight ahead in a forward direction of motion and the rake head is substantially perpendicular to the forward direction of motion, and wherein the members are further configured such that whichever member that extends between the hitch and the wing section on an inside of a substantially zero radius turn is automatically placed into a fully extended or taut condition by virtue of relative motion between the hitch and the wing section on the inside of the turn to thereby become effective to upwardly lift the wing section on the inside of the turn up off the granular surface during the substantially zero radius turn while whichever member that extends between the hitch and the wing section on an outside of the turn remains in the collapsed or slack condition to leave the wing section on the outside of the turn in contact with the granular surface during the substantially zero radius turn.

* * * * *